United States Patent
Hahm

(10) Patent No.: US 8,498,321 B2
(45) Date of Patent: Jul. 30, 2013

(54) METHOD AND SYSTEM FOR OPTIMIZING PROGRAMMABLE INTERFERENCE SUPPRESSION

(75) Inventor: Mark Hahm, Hartland, WI (US)

(73) Assignee: Broadcom Corporation, Irvine, CA (US)

( * ) Notice: Subject to any disclaimer, the term of this patent is extended or adjusted under 35 U.S.C. 154(b) by 218 days.

(21) Appl. No.: 12/575,840

(22) Filed: Oct. 8, 2009

(65) Prior Publication Data

US 2011/0065441 A1 Mar. 17, 2011

(51) Int. Cl.
*H04B 1/00* (2006.01)

(52) U.S. Cl.
USPC ........... 375/140; 375/144; 375/147; 375/148; 375/316; 375/346; 375/348; 370/320; 370/335; 370/342; 455/63.1; 455/296

(58) Field of Classification Search
USPC .............. 375/140, 147, 144, 148, 316, 346, 375/348; 370/320, 335, 342; 455/63.1, 296
See application file for complete search history.

(56) References Cited

U.S. PATENT DOCUMENTS

| | | | |
|---|---|---|---|
| 6,023,462 A | 2/2000 | Nieczyporowicz et al. | |
| 6,801,565 B1 * | 10/2004 | Bottomley et al. | 375/148 |
| 7,027,533 B2 | 4/2006 | Abe et al. | |
| 7,881,412 B2 * | 2/2011 | Banister | 375/346 |
| 8,085,889 B1 * | 12/2011 | Narayan et al. | 375/346 |
| 8,131,221 B2 | 3/2012 | Hahm et al. | |
| 8,208,856 B2 | 6/2012 | Hahm et al. | |
| 8,284,819 B2 | 10/2012 | Hahm et al. | |
| 2003/0035491 A1 | 2/2003 | Walton et al. | |
| 2004/0013172 A1 | 1/2004 | Hashiguchi et al. | |
| 2004/0204113 A1 | 10/2004 | Kisigami et al. | |
| 2005/0059348 A1 | 3/2005 | Chae et al. | |
| 2005/0107057 A1 | 5/2005 | Sun | |
| 2005/0195889 A1 | 9/2005 | Grant et al. | |
| 2005/0271123 A1 | 12/2005 | Fulghum | |
| 2007/0104254 A1 | 5/2007 | Bottomley et al. | |
| 2007/0110132 A1 | 5/2007 | Guess et al. | |
| 2007/0110137 A1 | 5/2007 | Guess et al. | |
| 2007/0111664 A1 | 5/2007 | Levin et al. | |

(Continued)

FOREIGN PATENT DOCUMENTS

WO   WO 2009/019540 A1   2/2009

OTHER PUBLICATIONS

Non-Final Rejection mailed Jan. 23, 2012 for U.S. Appl. No. 12/575,879, filed Oct. 8, 2009; 11 pages.

(Continued)

*Primary Examiner* — Leila Malek

(74) *Attorney, Agent, or Firm* — Sterne, Kessler, Goldstein & Fox P.L.L.C.

(57) ABSTRACT

A wireless system may receive a plurality of multipath signals from a plurality of transmitters and sequentially process each of a plurality of data symbols in the received multipath signals utilizing a plurality of shared hardware modules within a chip. Desired information may be recovered from data transmitted by one or more of the transmitters utilizing the interference suppressed signal. Chips of data may be cell combined utilizing one or more of shared hardware modules. The shared modules may include channel rotation modules and sum and difference modules. One or more fast Hadamard transforms and/or inverse Hadamard transforms may be performed utilizing shared hardware modules. Data symbols may be interpolated, scrambled, descrambled, and/or weighted and added back utilizing the shared hardware modules.

18 Claims, 14 Drawing Sheets

U.S. PATENT DOCUMENTS

| | | |
|---|---|---|
| 2007/0127434 A1 | 6/2007 | Heinle |
| 2007/0263744 A1 | 11/2007 | Mostafa |
| 2008/0212654 A1 | 9/2008 | Nilsson et al. |
| 2009/0129448 A1 | 5/2009 | Koslov et al. |
| 2009/0323796 A1 | 12/2009 | Futatsugi et al. |
| 2011/0007852 A1 | 1/2011 | Kimata |
| 2011/0043386 A1 | 2/2011 | Kong et al. |
| 2011/0064122 A1 | 3/2011 | Hahm et al. |
| 2011/0065447 A1 | 3/2011 | Hahm et al. |
| 2011/0075648 A1 | 3/2011 | Kong et al. |
| 2011/0075708 A1 | 3/2011 | Hahm et al. |
| 2011/0085493 A1 | 4/2011 | Chang et al. |
| 2011/0090996 A1 | 4/2011 | Hahm et al. |
| 2011/0092229 A1 | 4/2011 | Chang et al. |
| 2011/0096812 A1 | 4/2011 | Hahm et al. |
| 2011/0096813 A1 | 4/2011 | Hahm et al. |
| 2011/0103530 A1 | 5/2011 | Luo et al. |
| 2011/0111761 A1 | 5/2011 | Luo et al. |
| 2012/0307872 A1 | 12/2012 | Hahm et al. |

OTHER PUBLICATIONS

Final Rejection mailed Jun. 28, 2012 for U.S. Appl. No. 12/575,879, filed Oct. 8, 2009; 10 pages.

Non-Final Rejection mailed Mar. 28, 2012 for U.S. Appl. No. 12/605,000, filed Oct. 23, 2009; 10 pages.

Final Rejection mailed Jul. 18, 2012 for U.S. Appl. No. 12/605,000, filed Oct. 23, 2009; 10 pages.

Non-Final Rejection mailed Feb. 21, 2012 for U.S. Appl. No. 12/582,771, filed Oct. 21, 2009; 5 pages.

Notice of Allowance mailed Jun. 1, 2012 for U.S. Appl. No. 12/582,771, filed Oct. 21, 2009; 5 pages.

Notice of Allowance mailed Oct. 31, 2012 for U.S. Appl. No. 12/605,000, filed Oct. 23, 2009; 8 pages.

Notice of Allowance mailed Oct. 19, 2011 for U.S. Appl. No. 12/604,976, filed Oct. 23, 2009; 8 pages.

Non-Final Rejection mailed Feb. 1, 2013 for U.S. Appl. No. 13/588,297, filed Aug. 17, 2012; 9 pages.

Non-Final Rejection mailed Mar. 26, 2012 for U.S. Appl. No. 12/604,978, filed Oct. 23, 2009; 18 pages.

Notice of Allowance mailed Jul. 18, 2012 for U.S. Appl. No. 12/604,978, filed Oct. 23, 2009; 4 pages.

Notice of Allowance mailed Oct. 25, 2012 for U.S. Appl. No. 12/604,978, filed Oct. 23, 2009; 9 pages.

* cited by examiner

METHOD AND SYSTEM FOR OPTIMIZING PROGRAMMABLE INTERFERENCE SUPPRESSION

CROSS-REFERENCE TO RELATED APPLICATIONS/INCORPORATION BY REFERENCE

This application makes reference to:
U.S. patent application Ser. No. 12/582,771 filed on Oct. 21, 2009;
U.S. patent application Ser. No. 12/604,978 filed on Oct. 23, 2009;
U.S. Provisional Patent Application Ser. No. 61/242,524 filed on Sep. 15, 2009;
U.S. patent application Ser. No. 12/573,803 on Oct. 5, 2009;
U.S. patent application Ser. No. 12/604,976 filed on Oct. 23, 2009;
U.S. patent application Ser. No. 12/611,810 filed on Nov. 3, 2009;
U.S. Provisional Patent Application Ser. No. 61/246,797 filed on Sep. 29, 2009;
U.S. patent application Ser. No. 12/575,879 filed on Oct. 8, 2009;
U.S. patent application Ser. No. 12/615,237 filed on Nov. 9, 2009;
U.S. Provisional Patent Application Ser. No. 61/288,008 filed on Dec. 18, 2009;
U.S. Provisional Patent Application Ser. No. 61/242,554 filed on Sep. 15, 2009;
U.S. patent application Ser. No. 12/612,272 filed on Nov. 4, 2009;
U.S. patent application Ser. No. 12/605,000 filed on Oct. 23, 2009;
U.S. patent application Ser. No. 12/543,283 filed on Aug. 18, 2009;
U.S. patent application Ser. No. 12/570,736 filed on Sep. 30, 2009;
U.S. patent application Ser. No. 12/577,080 filed on Oct. 9, 2009; and
U.S. patent application Ser. No. 12/603,304 filed on Oct. 21, 2009.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for optimizing programmable interference suppression.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical base transceiver station, each of these spreading codes is referred to as a Walsh code. The Walsh coded digital signal may in turn be scrambled by utilizing a pseudo noise (PN) bit sequence to generate chips. An example of a PN bit sequence is a Gold code. Each of a plurality of base transceiver station within an RF coverage area may utilize a distinct PN bit sequence. Consequently, Walsh codes may be utilized to distinguish distinct digital signals concurrently transmitted from a given base transceiver station via a common RF channel while PN bit sequences may be utilized to distinguish digital signals transmitted by distinct base transceiver stations. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a first mobile communication device may be engaged in a communication session with a user utilizing a second mobile communication device via a first base transceiver station within a wireless communication network. For example, the second mobile communication device may transmit a digital signal to the first base transceiver station which may then transmit to the first mobile communication device. The first base transceiver station may encode signals received from the second mobile communication device and transmitted to the first mobile communication device by utilizing a Walsh code and a PN sequence. The first mobile communication device may receive signals transmitted concurrently by a plurality of base transceiver stations in addition to the first base transceiver station within a given RF coverage area. The first mobile communication device may process the received signals by utilizing a descrambling code that is based on the PN sequence and a despreading code that is based on the Walsh code. In doing so, the first mobile communication device may detect a highest relative signal energy level for signals received from the first base transceiver station, which comprise a digital signal corresponding to the second mobile communication device.

However, the first mobile communication device may also detect signal energy from the digital signals that correspond to signals from mobile communication devices other than the second mobile communication device. The other signal energy levels from each of these other mobile communication devices may be approximated by Gaussian white noise, but the aggregate noise signal energy level among the other mobile communication devices may increase in proportion to the number of other mobile communication devices whose signals are received at the first mobile communication device. This aggregate noise signal energy level may be referred to as multiple access interference (MAI). The MAI may result from signals transmitted by the first base transceiver station, which originate from signals received at the first base transceiver station from mobile communication devices other than the second mobile communication device. The MAI may also result from signals transmitted by the base transceiver stations BTSs other than the first base transceiver station. The MAI and other sources of noise signal energy may interfere with the ability of the first mobile communication device to successfully decode signals received from the second mobile communication device.

An additional source of noise signal energy may result from multipath interference. The digital signal energy corresponding to the second mobile communication device, which is transmitted by the first base transceiver station may disperse in a wavefront referred to as a multipath. Each of the components of the multipath may be referred to as a multipath signal. Each of the multipath signals may experience a different signal propagation path from the first base transceiver station to the second mobile communication device. Accordingly, different multipath signals may arrive at different time instants at the second mobile communication device. The time duration, which begins at the time instant that the first multipath signal arrives at the second mobile communication device and ends at the time instant that the last multipath signal arrives at the second mobile communication device is referred to as a delay spread. The second mobile communication device may utilize a rake receiver that allows the second mobile communication device to receive signal energy from a plurality of multipath signals received within a receive window time duration. The receive window time duration may comprise at least a portion of the delay spread time duration. Multipath signals, which are not received within the receive window time duration may also contribute to noise signal energy.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for optimizing programmable interference suppression, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for optimizing programmable interference suppression. In various exemplary aspects of the invention, a wireless system may receive a plurality of multipath signals from a plurality of transmitters and sequentially process each of a plurality of data symbols in the received multipath signals utilizing a plurality of shared hardware modules. Desired information may be recovered from data transmitted by one or more of the plurality of transmitters utilizing the interference suppressed signal. Chips of data may be cell combined utilizing one or more of the plurality of shared hardware modules. The plurality of shared modules may comprise channel rotation modules and sum and difference modules. One or more fast Hadamard transforms and/or inverse Hadamard transforms may be performed utilizing one or more of the plurality of shared hardware modules. Data symbols may be interpolated, scrambled, descrambled, and/or weighted and added back utilizing one or more of the plurality of shared hardware modules.

Figure 1:
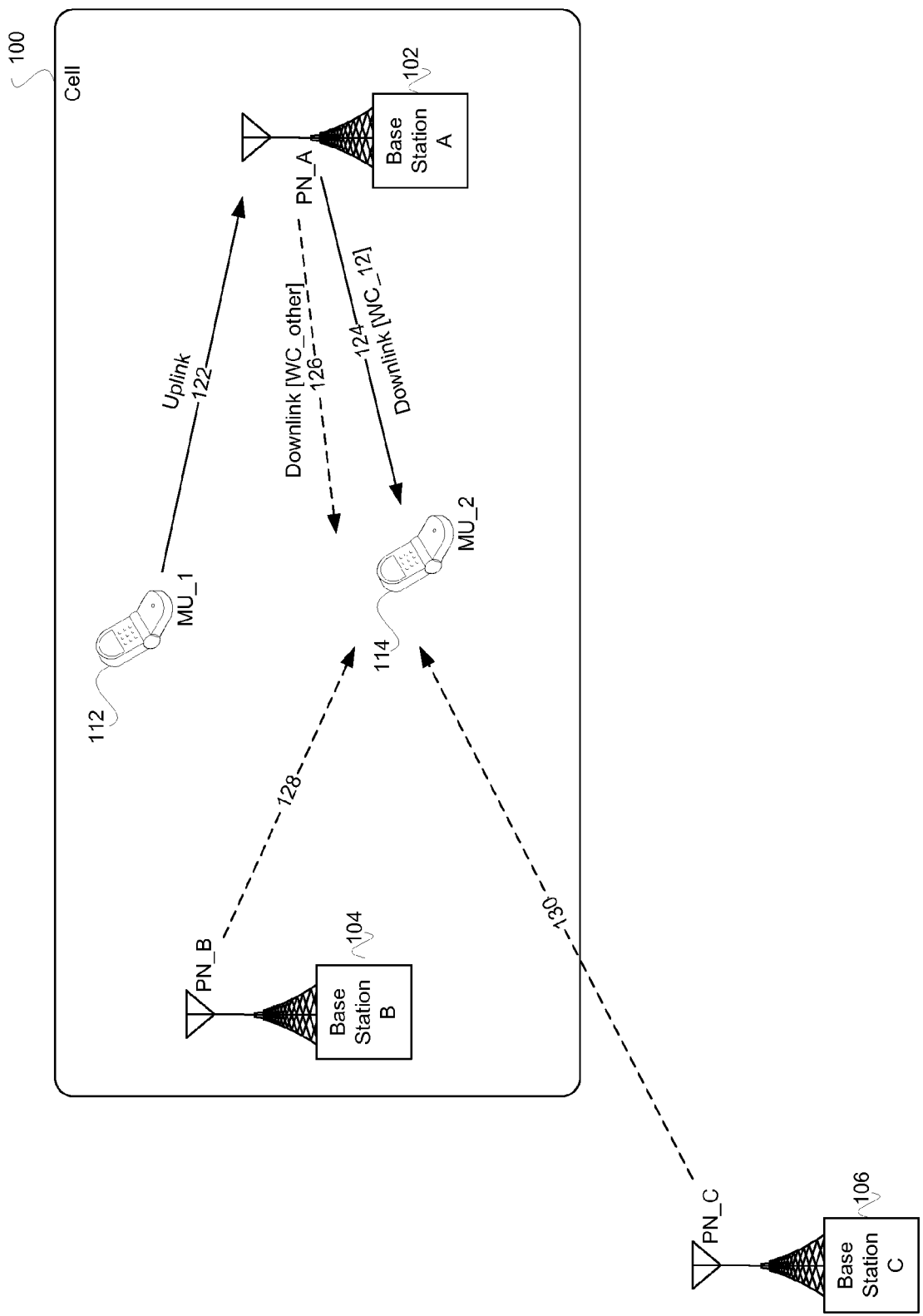
FIG. 1 is a diagram illustrating an exemplary wireless communication system, which is operable to provide interference suppression in WCDMA, in accordance with an embodiment of the invention.

FIG. 1 is an illustration of an exemplary wireless communication system, in accordance with an embodiment of the invention. Referring to FIG. 1, there is shown a cell 100 and a base station C 106. The cell 100 comprises base station A 102, base station B 104, mobile communication device MU_1 112 and mobile communication device MU_2 114. The base station 106 may be located outside of the cell 100.

The mobile communication devices MU_1 112 and MU_2 114 may be engaged in a communication via the base station A 102. The mobile communication device MU_1 112 may transmit signals to the base station A 102 via an uplink RF channel 122. In response, the base station A 102 may transmit signals to the mobile communication device MU_2 114 via a downlink RF channel 124. Signals transmitted by the base station A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the base station A 102 via the downlink RF channel 124 from signals transmitted concurrently by the base station A 102 via other downlink RF channels, for example downlink RF channel 126. The base station A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, signals received via RF channel 126 may be transmitted by the base station A 102. Signals received via RF channel 128 may be transmitted by the base station B 104. Signals transmitted by the base station 104 may be scrambled based on a scrambling code PN_B. Signals received via RF channel 130 may be transmitted by the base station C 106. Signals transmitted by the base station C 106 may be scrambled based on a scrambling code PN_C.

The MU_2 114 may be operable to perform a soft handoff from the current serving base station A 102 to any of a plurality of base stations located within the cell 100, for example, the base station B 104. Accordingly, the MU_2 114 may be operable to process received signals based on scrambling code PN_A and/or scrambling code PN_B. In this regard, the mobile communication device MU_2 114 may listen for signals from both base station A 102 and base station B 104. The mobile communication device MU_2 114 may not be operable to perform a soft handoff from the current serving base station A 102 to a base station, which is outside of the cell 100, for example, the base station C 106. Accordingly, the mobile communication device MU_2 114 may not be operable to process received signals based on scrambling code PN_C. In this regard, MU_2 114 may not listen for signals from base station C 106.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize an iterative method for interference cancellation. The iterative method may comprise a weighting iteration, one or more weighting and addback iterations, and an addback iteration.

In an embodiment of the invention, the MU_2 may comprise a programmable interference suppression module that may be operable to process a transmitted 256-chip symbol sequentially. A subtractor residue buffer may communicate the samples to the interference suppression module, and may comprise cx2 samples, which may then be interpolated to cx8 samples in a cell chip combiner. The cx8 samples may be maximal ratio combined to a cx1 output of 256 chips which may be descrambled and communicated to a Fast Walsh Transform processing block. The output of the Walsh Transform may represent the estimated signal for each of the OVSF codes.

The estimated signal may then be added to the associated stored signal estimation and weighted. The difference between the newly generated signal estimation and the stored signal estimation may be communicated to an inverse Walsh Transform process block, the output of which may be rescrambled and utilized to reconstruct the multipath signal to be subtracted from a subtractor, described further with respect to FIG. 4.

Figure 2:
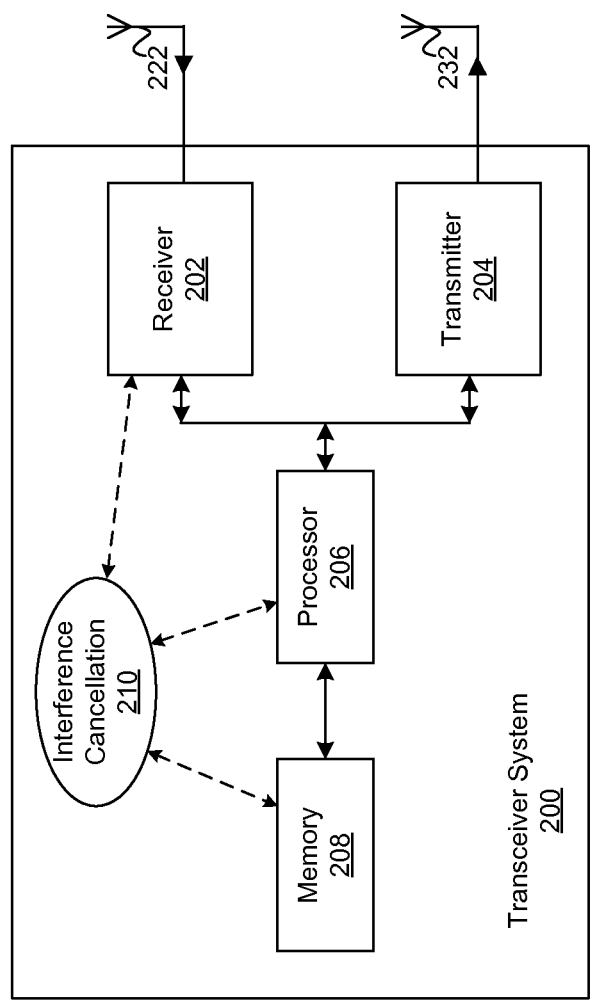
FIG. 2 is a diagram of an exemplary communication device, which is operable to provide interference suppression for WCDMA, in accordance with an embodiment of the invention.

FIG. 2 is a diagram of an exemplary communication device, which may utilize interference suppression for WCDMA, in accordance with an embodiment of the invention. Referring to FIG. 2, there is shown a transceiver system 200, a receiving antenna 222 and a transmitting antenna 232. The transceiver system 200 may comprise at least a receiver 202, a transmitter 204, a processor 206, an interference cancellation module 210 and a memory 208. Although a separate receiver 202 and transmitter 204 are shown in FIG. 2, the invention is not so limited. In this regard, the transmit function and receive function may be integrated into a single transceiver block. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may process the received RF signals to generate baseband signals. A chip-level baseband signal may comprise a plurality of chips. The chip-level baseband signal may be rescrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise a desired signal and one or more interference signals. The interference cancellation module 210 may generate an interference suppressed version of the signal in which the signal level for the interference signals is reduced relative to the signal level for the desired signal.

In operation, the receiver 202 may receive signals via the receiving antenna 222. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process a distinct one of a plurality of multipath signals that are received within a delay spread time duration. Based on received RF signals, the receiver may generate chip-level baseband signals. The receiver 202 may communicate the chip level baseband signals to the interference cancellation module 210. The rake receiver 202 may generate one or more symbol-level baseband signals based on a selected one or more OVSF codes and a selected one or more PN sequences. The symbol-level baseband signals may be communicated to the processor 206. The OVSF codes may be selected based on a specified desired user signal. For example, referring to FIG. 1, the rake receiver 202 associated with mobile communication device MU_2 may select an OVSF code, WC_12, and a PN sequence, PN_A, which may then be utilized to generate the symbol-level baseband signal from the chip-level baseband signal.

The processor 206 may utilize common pilot channel (CPICH) information, communicated by the signals received from the receiver 202, to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given base transceiver station and received at a finger in the rake receiver. The computed channel estimate values may be represented as a channel estimate matrix, $H_{bts,fgr}$, where bts represents a numerical index that is associated with a given base transceiver station and fgr is a numerical index that is associated with a given rake finger. The processor 206 may communicate the computed channel estimate values to the receiver 202 and to the interference cancellation module 210 and/or to the memory 208. The processor 206 may compute and/or select one or more interference cancellation parameter values, which control the signal interference cancellation performance of the interference cancellation module 210. The processor 206 may communicate the interference cancellation parameter values to the interference cancellation module 210 and/or to the memory 208.

The processor 206 may also determine which base transceiver stations are associated with a current cell 100 and which base transceiver stations are not associated with the current cell 100. For example, the processor 206 may determine that the base station A 102 and the base station B 104 are associated with the current cell 100, while the base station C 106 is not associated with the current cell 100. In an exemplary embodiment of the invention, the processor 206 may store PN sequence for at least a portion of the base transceiver stations that are associated with the current cell 100. For example, referring to FIG. 1, the processor 206 may generate and/or store corresponding PN sequences, for example PN_A and PN_B in the memory 208. The PN sequences PN_A and PN_B may be associated with the current cell 100.

In other exemplary embodiments of the invention, the processor 206 may store PN sequences for at least a portion of the base transceiver stations that are associated with the current cell 100 and at least a portion of the base transceiver stations that are not associated with the current cell 100. For example, referring to FIG. 1, the processor 206 may generate and/or store corresponding PN sequences, for example PN_A, PN_B and PN_C in the memory 208. In general, the processor 206 may store the PN sequences for the base transceiver stations from which a mobile communication device, for example the mobile communication device MC_2 114, may expect to receive signals and the processor 206 may store PN sequences from which the mobile communicating device may not expect to receive signals. The mobile communication device may expect to receive signals, for example common pilot channel (CPICH) signals, from a plurality of base transceiver stations in anticipation of a soft handoff from a current service base transceiver station to a subsequent serving base transceiver station.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. In various embodiments of the invention, which utilize receive diversity, the receiver 202 and/or the interference cancellation module 210 may also process signals that are transmitted by base transceiver stations, which utilize signal transmission diversity.

The interference cancellation module 210 may receive signals from the receiver 202, which correspond to received multipath signals. The signals received by the interference cancellation module 210 may comprise chip-level baseband signals. A plurality of chips, for example 256 chips, may be associated with a data symbol. The interference cancellation module 210 may be operable to determine a time duration that corresponds to a data symbol processing period. The interference cancellation module 210 may be operable to determine whether to perform iterations of a signal interference suppression method on received chip-level baseband signals and/or symbol-level baseband signals, in accordance with an embodiment of the invention, during each data symbol processing period. The determination of whether to perform iterations of the signal interference suppression method may be based on, for example, the time instants that chips, which are associated with a current data symbol and/or subsequent data symbol, arrive at the receiver 202 via received RF signals.

The interference cancellation module 210 may retrieve a plurality of channel estimate values, one or more PN sequences, a plurality of OVSF codes, and one or more interference cancellation parameter values from memory 208. The interference cancellation module 210 may receive timing information from the receiver 202 that corresponds to each of the fingers in the rake receiver portion of the receiver 202.

The interference cancellation module 210 may process received signals, utilizing received timing information and channel estimate values to combine the multipath signals, which are associated with corresponding fingers in the rake receiver. In various embodiments of the invention, the interface cancellation module 210 may combine the multipath signals to generate a combined chip-level signal by utilizing, for example, maximal ratio combining (MRC) and/or equal gain combining (EGO). The interference cancellation module 210 may process the combined chip-level signal, by utilizing PN sequences and OVSF codes, to determine a signal level associated with each of the plurality of OVSF codes for each of one or more selected PN sequences. In an exemplary embodiment of the invention, the plurality of OVSF codes comprises 256 Walsh codes. Each signal associated with an OVSF code may be referred to as a corresponding user signal. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile communication device MC_2 114.

The interference cancellation module 210 may compute a signal power level value and a noise power level value corresponding to each of the user signals. Based on the computed signal power level value, noise power level value and the one or more interference cancellation parameter values, the interference cancellation module 210 may compute a weighting factor value corresponding to each user signal. The plurality of weighting factor values associated with each base transceiver station may be represented as a weighting factor matrix, $A_{bts}$, where bts represents a numerical index value that is associated with a given base transceiver station. In an exemplary embodiment of the invention, the weighting factor values for a given base transceiver station may be computed as shown in the following equations:

$$z(j) \triangleq \frac{\lambda x^2(j)}{\lambda x^2(j) + y^2(j)} \quad [1a]$$

when $$x^2(j) > \gamma y^2(j) \quad [1b]$$

and:

$$z(j) = 0 \quad [1c]$$

when $$x^2(j) \leq \gamma y^2(j) \quad [1d]$$

where $z(j)$ represents the weighting factor value for the $j^{th}$ user signal, $x^2(j)$ represents the signal power level value for the $j^{th}$ user signal, which was generated by descrambling a received signal based on a PN sequence for the given base transceiver station, $y^2(j)$ represents the noise power level value for the $j^{th}$ user signal, which was generated by descrambling the received signal based on the PN sequence for the given base transceiver station, and $\lambda$ and $\gamma$ represent interference cancellation parameter values.

The weighting factor values $z(j)$ may correspond to a signal to noise ratio (SNR) measure for the $j^{th}$ user signal. Values for $z(j)$ may be within the range $0 \leq z(j) \leq 1$. In one regard, the values of $z(j)$ may be an a priori measure of confidence that a given user signal comprises valid signal energy that was transmitted by the base transceiver station. A "user" and an OVSF code are not necessarily equivalent. Accordingly a user may occupy multiple OVSF codes, and a user with a short spreading factor may project energy into multiple OVSF codes.

The interference cancellation module 210 may be operable to process chip-level signals received from each of a plurality of rake fingers in the receiver 202 to generate corresponding interference suppressed chip-level signals based on an iterative method for interference cancellation, in accordance with an embodiment of the invention. The interference suppressed chip-level signals may be output to each corresponding rake finger. Each of the rake fingers may then process its respective interference suppressed chip-level signals.

The weighting factor value $z(j)$ may be a function of the interference cancellation parameter values $\lambda$ and $\gamma$. In various embodiments of the invention, the interference cancellation parameters $\lambda$ and $\gamma$ may comprise integer and/or non-integer values. In an exemplary embodiment of the invention, $\lambda = 1$ and $\gamma = 1$. The processor 206 may be operable to monitor the interference cancellation performance of the interference cancellation module 210, for example by measuring SNR values for processed signals generated by the receiver 202 based on interference suppressed chip-level signals. Accordingly, the processor 206 may be operable to adjust one or both interference cancellation parameter values $\lambda$ and $\gamma$.

In an embodiment of the invention, the interference cancellation module 210 may be operable to process a transmitted 256-chip symbol sequentially. A subtractor residue buffer may communicate the samples to a suppression module, and may comprise cx2 samples, which may then be interpolated to cx8 samples in a cell chip combiner. The cx8 samples may be maximal ratio combined to a cx1 output of 256 chips which may be descrambled and communicated to a Fast Walsh Transform process block. The output of the Walsh Transform may represent the estimated signal for each of the OVSF codes.

The estimated signal may be added to the associated stored signal estimation, and then weighted. The difference between the newly generated signal estimation and the stored signal estimation may be communicated to an inverse Walsh Transform process block, the output of which may be rescrambled and utilized to reconstruct the multipath signal to be subtracted from a subtractor, described further with respect to FIG. 4.

Figure 3:
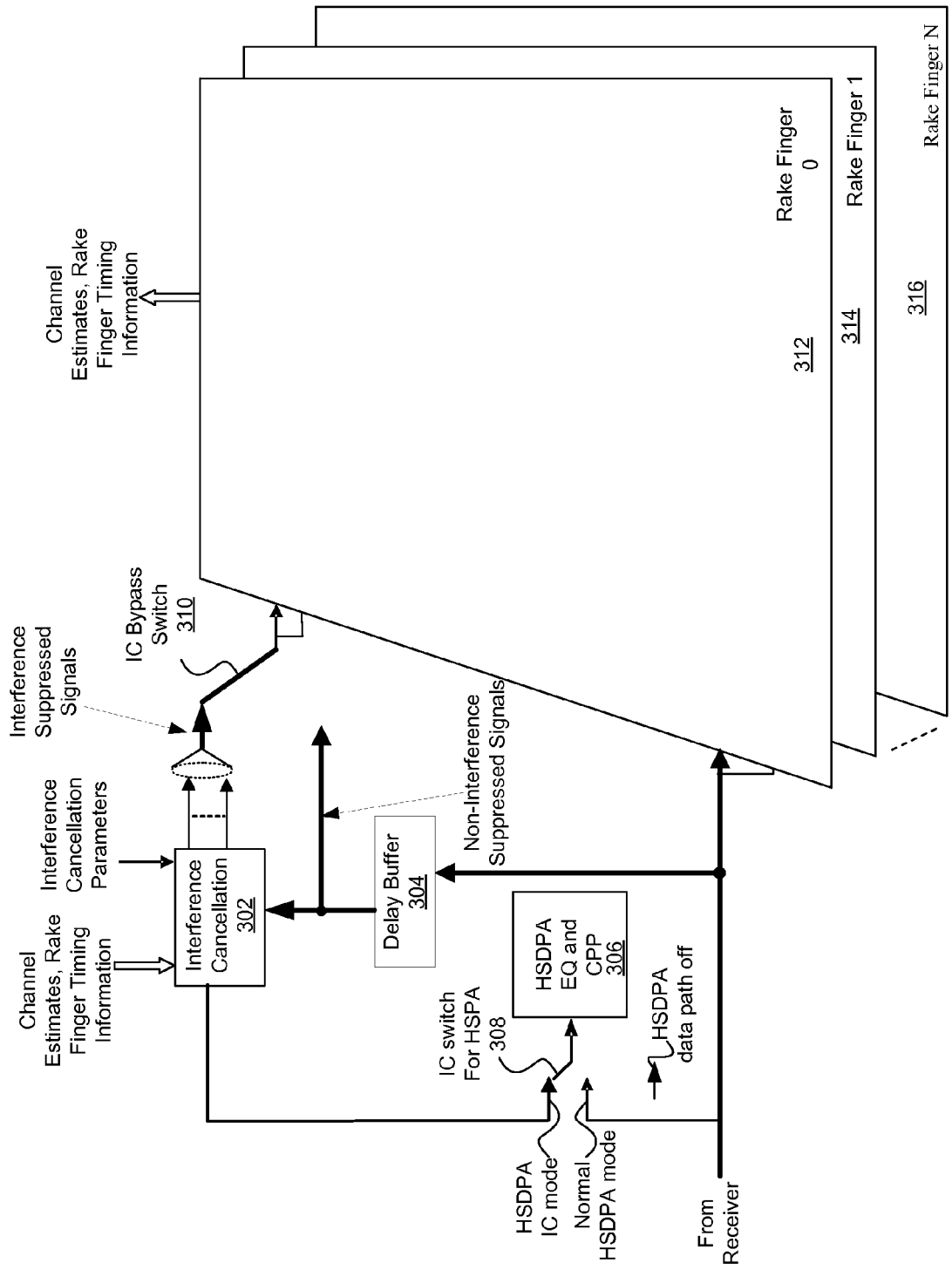
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown an interference cancellation module 302, a delay buffer 304, a HSDPA processor 306, an HSDPA switching device 308, interference cancellation (IC) bypass switching device 310, and a plurality of rake fingers 312, 314 and 316. The interference cancellation module 302 may correspond to the interference cancellation module 210 as presented in FIG. 2. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a signal level value as input at a given input time instant and output the signal level value at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As shown in FIG. 3, the HSDPA switching device 308 is configured so that it is operable to supply an interference suppressed signal, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply a baseband signal, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As shown in FIG. 3, the IC bypass switching device 310 is configured so that it is operable to supply an interference suppressed signal, generated by the interference cancellation module 302, as an input to the rake fingers 312, 314 and 316.

The IC bypass switching device 310 may also be configured so that it is operable to supply a signal, which is output from the delay buffer 304, as an input to the rake fingers 312, 314 and 316. The signal output from the delay buffer 304 may comprise a time-delayed version of a baseband signal generated by the receiver 202. As indicated in FIG. 3, the signal output from the delay buffer 304 may comprise a non-interference suppressed signal.

Each of the rake fingers 312, 314 and 316 may receive, as input, a baseband signal generated by the receiver 202. Based on the respective input baseband signal from the receiver 202, each rake finger 312, 314 and 316 may generate channel estimates and rake finger timing information. In various embodiments of the invention, each rake finger 312, 314 and 316 may generate the channel estimates and/or rake finger timing information for selected multipath signals based on CPICH data received via the input baseband signals received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each rake finger 312, 314 and 316 may communicate its respective channel estimates and/or rake finger timing information to the interference cancellation module 302.

In various embodiments of the invention, the interference cancellation module 302 may receive chip-level signals from the delay buffer 304. Based on the channel estimates and rake finger timing information, the interference cancellation module 302 may select individual multipath signals from the chip-level signals received via the delay buffer 304. Based on the interference cancellation parameters, the interference cancellation module 302 may process received chip-level multipath signals by utilizing an iterative method for interference cancellation, in accordance with an embodiment of the invention.

The chip-level signals received from the delay buffer 304 may comprise a plurality of multipath signals received from one or more base transceiver stations. The interference cancellation module 302 may be configurable to assign signal processing resources to perform the iterative method of interference cancellation for selected multipath signals. The selected multipath signals may be received from one or more base transceiver stations. The processor 206 may configure the interference cancellation module 302 to receive multipath signals from one or more base transceiver stations. In an exemplary embodiment of the invention, which comprises a receive diversity system, the selected multipath signals may be received via one or more of a plurality of receiving antennas. The processor 206 may configure the interference cancellation module 302 for receive diversity.

The interference cancellation module 302 may receive interference cancellation parameters from the processor 206 and/or from the memory 208. In an exemplary embodiment of the invention, the interference cancellation module 302 may retrieve and/or generate PN sequences and/or OVSF codes from the memory 208. The interference cancellation module 302 may retrieve and/or generate a PN sequence for each of the base transceiver stations from which the interference cancellation module 302 is configured to attempt to receive a signal. In an embodiment of the invention, PN sequences may be generated real time utilizing knowledge of the code structure and known or hypothesized timing information.

The interference cancellation module 302 may compute weighting factor values for each of the potential user signals contained within a given chip-level signal as shown, for example, in equations [1]. A plurality of weighting factors may be computed for each potential user signal, for each of the base transceiver stations from which the interference cancellation module 302 is configured to receive a signal and/or for each receiving antenna from which the receiver 202 may receive a signal.

The interference cancellation module 302 may be operable to compute the weighting factors for a given receiving antenna and for a given base transceiver station by combining received chip-level signals corresponding to the given receiving antenna, based on the corresponding channel estimate values, to generate combined chip-level signals. The interference cancellation module 302 may be operable to descramble the combined chip-level signals by utilizing a descrambling code based on the PN sequence corresponding to the given base transceiver station. The interference cancellation module 302 may generate a user signal for each potential user by despreading the descrambled chip-level signals by utilizing a plurality of potential OVSF codes, for example Walsh codes. In an exemplary embodiment of the invention, the despreading of the descrambled chip level signals by the plurality of potential OVSF codes may comprise a Walsh transform operation. The exemplary Walsh transform operation may generate a plurality of user signals, for which each of the plurality of user signals may comprise a symbol-level baseband signal. The interference cancellation module 302 may be operable to compute a weighting factor, $z(j)$, corresponding to a $j^{th}$ user signal based on the corresponding $j^{th}$ user symbol-level baseband signal. Each weighting factor, $z(j)$, may be stored in the memory 208.

During a weighting iteration, the interference cancellation module 302 may be operable to multiply an initial $j^{th}$ user symbol-level baseband signal and the corresponding weighting factor value to generate a current estimated $j^{th}$ user symbol-level baseband signal. The current estimated $j^{th}$ user symbol-level baseband signal represents a first estimate of an interference suppressed version of the initial received signal.

The weighting iteration may be repeated for each user signal, for each base transceiver station and/or for each transmitting and/or receiving antenna. Each of the current estimated $j^{th}$ user symbol-level baseband signal may be stored in the memory 208. The current estimated symbol-level baseband signal for the potential users may be represented as shown in the following equation:

$$B_{rx}(1) = \sum_{bts=1}^{N\_BTS} \sum_{fgr=1}^{N\_FGR} A_{rx}(bts) C^H S^H(bts) H_{rx}(bts, fgr) Y_{rx}(fgr) \quad [2]$$

where $B_{rx}(1)$ represents a vector representation of current estimated symbol-level baseband signals for the potential users for signals received via a given receiving antenna rx; $A_{rx}(bts)$ represents a matrix representation for the weighting scale factors z(j) for the potential users for a given base station bts and for the given receiving antenna rx; $H_{rx}(bts,fgr)$ represents the channel estimate matrix $H_{bts,rx,fgr}$ for a given rake finger fgr; N_FGR represents the number of rake fingers 312, 314 and 316 in the rake receiver and N_BTS represents the configured number of base stations for the receiver 202; $Y_{rx}$(fgr) represents the signal received via a given receiving antenna rx at a given rake finger fgr; $C^H$ represents a complex conjugate transformed version of a channelization matrix C and $S^H$(bts) represents a complex conjugate transformed version of a PN sequence matrix S(bts). The matrix C may comprise a matrix representation of OVSF codes for the potential users and the matrix S(bts) may represent PN sequences for the base station bts. In an exemplary embodiment of the invention, the matrix $C^H$ may comprise a Walsh transform matrix.

In various embodiments of the invention in which the receiver 202 utilizes a plurality of receiving antennas, data received via the symbol-level signals corresponding to the plurality of receiving antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

The interference cancellation module 302 may generate a current estimated chip-level signal by spreading each of the plurality of j estimated symbol-level baseband signals by a corresponding OVSF code. In an exemplary embodiment of the invention, the spreading of symbol-level baseband signals by the plurality of potential OVSF codes may comprise an inverse Walsh transform operation. The inverse Walsh transformed estimated symbol-level baseband signals may be scrambled by the corresponding PN sequence to generate current estimated chip-level baseband signals. For each scrambling operation a plurality, corresponding to the number of rake fingers 312, 314 and 316, of current estimated chip-level baseband signals may be generated. The inverse Walsh transform and spreading operations may be repeated for each of the base transceiver stations and/or the receiving antennas.

During a subsequent weighting and addback iteration, the interference cancellation module 302 may subtract the current estimated chip-level baseband signals corresponding to a given receiving antenna from the received chip-level baseband signals corresponding to the given receiving antenna to generate a current residual chip-level signal corresponding to the given receiving antenna. The current residual chip-level signal represents an estimate of the noise and unsuppressed interference and desired signal values in the received signal. In various embodiments of the invention, the current residual chip-level signal corresponding to a given antenna may be represented as shown in the following equation:

$$R_{rx,fgr}(2) = Y_{rx,fgr} - \sum_{bts=1}^{N\_BTS} H_{rx,fgr}(bts) S(bts) CB(1) \quad [3]$$

where $R_{rx,fgr}(2)$ represents the current residual chip level signal for rake finger fgr corresponding to receiving antenna rx, $Y_{rx,fgr}$ represents the chip-level signal for rake finger fgr wherein the chip-level signal was received via receiving antenna rx and $H_{rx,fgr}$(bts) represents the channel estimate matrix $H_{bts,rx,fgr}$ for a given base station bts. In an exemplary embodiment of the invention, the matrix C may comprise an inverse Walsh transform matrix.

The interference cancellation module 302 may be operable to generate a plurality of current residual symbol-level baseband signals for each potential user for each base transceiver station and/or transmitting and/or receiving antenna based on corresponding current residual chip-level signals by a method as is substantially described above. For a current $j^{th}$ user residual symbol-level baseband signal, the interference cancellation module 302 may add the current estimated $j^{th}$ user symbol-level baseband signal, as computed during the weighting iteration, to generate a current $j^{th}$ user addback symbol-level baseband signal. The current $j^{th}$ user addback symbol-level baseband signal represents a first representation of the received signal as comprising an interference suppressed component (the current estimated $j^{th}$ user symbol-level baseband signal) and an interference component (the current $j^{th}$ user residual symbol-level baseband signal), which may be represented as shown in the following equation:

$$P_{rx}(2) = D_{rx}(2) + B_{rx}(1) \quad [4]$$

where $P_{rx}(2)$ represents a vector representation of the current addback symbol-level baseband signals for the potential users. $D_{rx}(2)$ represents a vector representation of the residual symbol-level baseband signals, which may be represented as shown in the following equation:

$$D_{rx}(2) = \sum_{bts=1}^{N\_BTS} \sum_{fgr=1}^{N\_FGR} A_{rx}(bts) C^H S^H(bts) H_{rx}(bts, fgr) R_{rx}(2)(fgr) \quad [5]$$

where $R_{rx}(2)$(fgr) represents the current residual chip-level signal $R_{rx,fgr}(2)$.

The interference cancellation module 302 may be operable to multiply the current $j^{th}$ user addback symbol-level baseband signal and the corresponding weighting factor value to generate an updated estimated $j^{th}$ user symbol-level baseband signal. The updated estimated symbol-level baseband signals may be represented as shown in the following equation:

$$B_{rx}(2) = \sum_{bts=1}^{N\_BTS} A_{rx}(bts)[D_{rx}(2) + B_{rx}(1)] \quad [6]$$

where $B_{rx}(2)$ represents a vector representation of updated estimated symbol-level baseband signals for the potential users.

The interference cancellation module 302 may be operable to subtract the current estimated $j^{th}$ user symbol-level baseband signal, as computed during the weighting iteration, from the updated estimated $j^{th}$ user symbol-level baseband signal to generate an incremental estimated $j^{th}$ user symbol-level baseband signal. The incremental estimated $j^{th}$ user symbol-level baseband signal represents an adjustment to the first estimate of the interference suppressed version of the received signal level, which was computed during the weighting iteration. The incremental estimated symbol-level baseband signals may be represented as shown in the following equation:

$$L_{rx}(2) = B_{rx}(2) - B_{rx}(1) \quad [7]$$

where $L_{rx}(2)$ represents a vector representation of the incremental estimated symbol-level baseband signals.

The weighting and addback iteration may be repeated for each user signal, for each base transceiver station and/or for each transmitting and/or receiving antenna. Each updated estimated $j^{th}$ user symbol-level baseband signal may be stored in the memory 208.

The interference cancellation module 302 may be operable to generate an incremental estimated chip-level signal based on the incremental symbol-level baseband signals, for each potential user, for each base transceiver station and/or for each receiving antenna, by performing inverse Walsh transform and spreading operations substantially as described above.

The interference cancellation module 302 may be operable to subtract the incremental estimated chip-level signals corresponding to a given receiving antenna from the current residual chip-level signal corresponding to the given receiving antenna to generate an updated residual chip-level signal for the given receiving antenna. The interference cancellation module 302 may generate an updated residual chip-level signal for each receiving antenna. In various embodiments of the invention, the updated residual chip-level signal corresponding to a given antenna may be represented as shown in the following equation:

$$R_{rx,fgr}(3) = R_{rx,fgr}(2) - \sum_{bts=1}^{N\_BTS} H_{rx,fgr}(bts)S(bts)CL(2) \quad [8]$$

where $R_{rx,fgr}(3)$ represents the updated residual chip level signal for rake finger fgr corresponding to receiving antenna rx.

In instances where the HSDPA processor 306 is operating in HSDPA IC mode, the interference cancellation module 302 may associate a cell identification value, cid, with each of the incremental estimated chip-level signals corresponding to a given receiving antenna. The interference cancellation module 302 may be operable to determine whether to subtract a given incremental estimated chip-level signal corresponding to the given receiving antenna from the current residual chip-level signal corresponding to the given receiving antenna based on the corresponding cid value for the incremental estimated chip-level signal. In various embodiments of the invention, each cid value may correspond to a PN sequence. In an exemplary embodiment of the invention, the interference cancellation module 302 may not subtract a given incremental estimated chip-level signal from the current residual chip-level signal when the corresponding cid value is associated with the current cell from which the receiver 202 expects to receive signals. The resulting generated updated residual chip-level signal may be communicated to the HSDPA processor 306.

During an addback iteration, the interference cancellation module 302 may be operable to generate a plurality of updated residual symbol-level baseband signals for each potential user for each of the base transceiver stations and/or the receiving antenna based on corresponding updated residual chip-level signals by a method, which is substantially described above. For a $j^{th}$ user updated residual symbol-level baseband signal, the interference cancellation module 302 may add the updated estimated $j^{th}$ user symbol-level baseband signal, as computed during the weighting and addback iteration, to generate a $j^{th}$ user interference suppressed symbol-level baseband signal. The interference suppressed symbol-level baseband signals may be represented as shown in the following equation:

$$P_{rx}(3) = D_{rx}(3) + B_{rx}(2) \quad [9]$$

where $P_{rx}(2)$ represents a vector representation of the interference suppressed symbol-level baseband signals for the potential users and $D_{rx}(3)$ represents the updated residual symbol-level signal based on $R_{rx,fgr}(3)$.

The interference cancellation module 302 may be operable to generate an interference suppressed chip-level baseband signal based on the interference suppressed symbol-level baseband signals, for each potential user, for each base transceiver station and/or for each transmitting and/or receiving antenna, by performing inverse Walsh transform and spreading operations substantially as described above. Each of the generated interference suppressed chip-level baseband signals may be communicated to a corresponding one of the rake fingers 312, 314 and 316.

In various embodiments of the invention, the rake fingers 312, 314 and 316 and/or HSDPA processor 306 may be operable to process the interference suppressed chip-level baseband signals. In instances in which the interference cancellation bypass switching device 310 is configured to select an output signal from the delay buffer 304, the rake fingers 312, 314 and 316 may process non-interference suppressed chip-level baseband signals. In instances in which the HSDPA switching device 308 is configured to place the HSDPA processor 306 in normal HSDPA mode, the HSDPA processor 306 may process non-interference suppressed chip-level baseband signals.

In an embodiment of the invention, the interference cancellation module 210 may be operable to process a transmitted 256-chip symbol sequentially. A subtractor residue buffer may communicate the samples to a suppression module, and may comprise cx2 samples, which may then be interpolated to cx8 samples in a cell chip combiner. The cx8 samples may be maximal ratio combined to a cx1 output of 256 chips which may be descrambled and communicated to a Fast Walsh Transform process block. The output of the Walsh Transform may represent the estimated signal for each of the OVSF codes.

The estimated signal may then be added to the associated stored signal estimation and weighted. The difference between the newly generated signal estimation and the stored signal estimation may be communicated to an inverse Walsh Transform process block, the output of which may be descrambled and utilized to reconstruct the multipath signal to be subtracted from a subtractor, described further with respect to FIG. 4.

Figure 4:
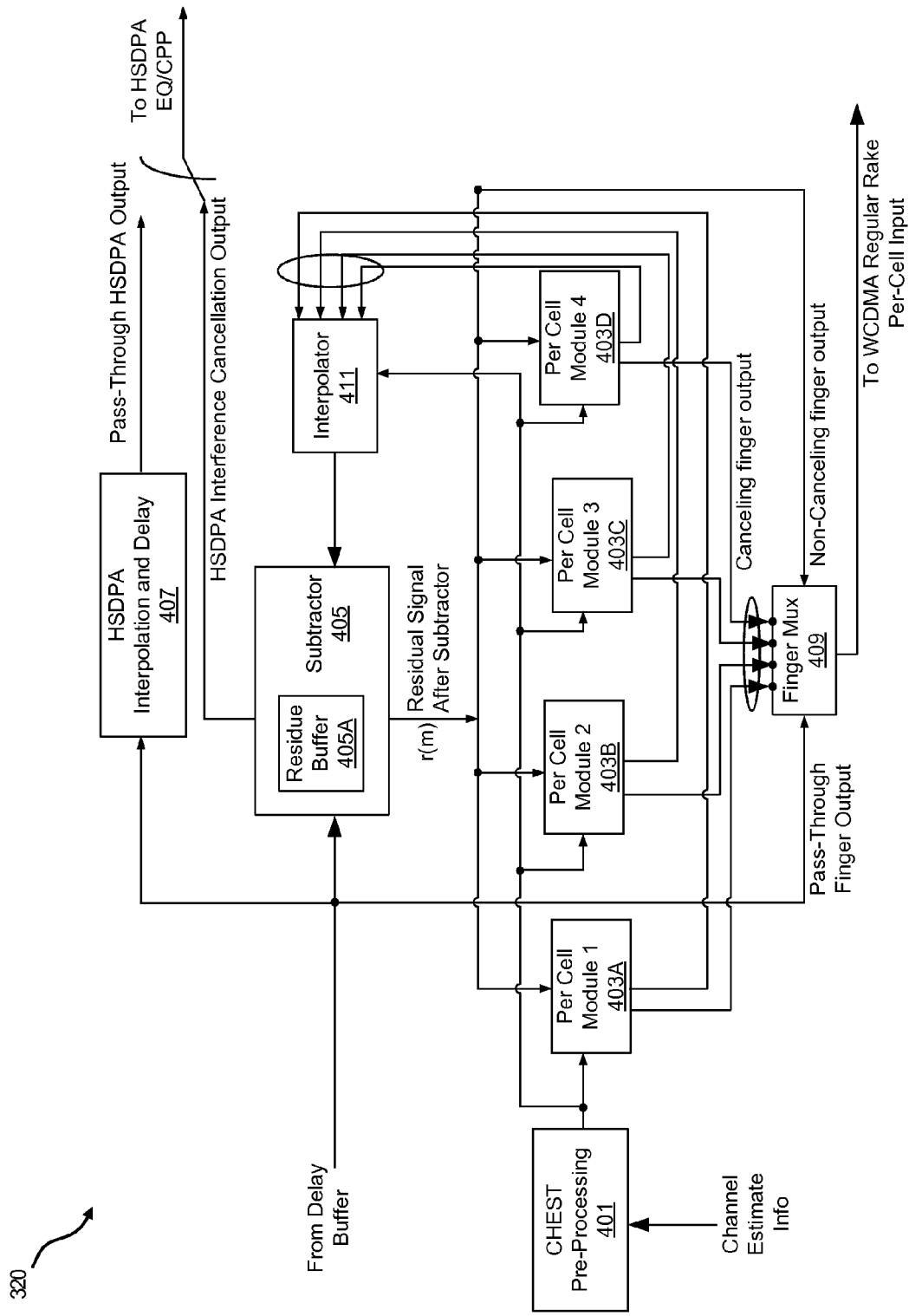
FIG. 4 is a block diagram illustrating an exemplary interference cancellation module, in accordance with an embodiment of the invention.

FIG. 4 is a block diagram illustrating an exemplary interference cancellation module, in accordance with an embodiment of the invention. Referring to FIG. 4, there is shown a interference cancellation module 320 comprising a channel estimate (CHEST) pre-processing block 401, per-cell modules 1 403A, 2 403B, 3 403C, 4 403D, a subtractor 405, an HSDPA interpolation and delay block 407, a finger MUX 409, and an interpolator 411.

The CHEST pre-processing block 401 may comprise suitable circuitry, logic, interfaces, and/or code that may be operable to normalize channel estimate information for each per-cell module, the per-cell modules 1-4.

The per-cell modules 1-4 403A-403D may comprise suitable circuitry, logic, interfaces, and/or code that may be operable to estimate a received signal for each of a plurality of OVSF coded signals. The per-cell modules 1-4 403A-403D may process a multi-path signal associated with a transmitted 256-chip symbol, for example, on a sequential basis. In this manner, desired signals may be removed leaving only interference signals that may be subsequently removed from the received signals.

In an embodiment of the invention, the four per-cell modules 1-4 403A-403D may enable interference cancellation for four non-diversity transmit (Tx) cells, two Tx diversity cells, one Tx diversity cell and two non-Tx diversity cells, one Tx diversity cell with two scrambling codes per antenna, and/or one non Tx-diversity cell that has four scrambling codes. However, the invention need not be so limited, and may support any number of cells depending on the number of Per-Cell modules integrated in the interference cancellation module.

The subtractor 405 may comprise suitable circuitry, logic, interfaces, and/or code that may be operable to subtract interpolated estimated signals from received signals for reducing interference signals. The subtractor 405 may also comprise a residual buffer 405A for storing processed data. In an embodiment of the invention, the residual buffer 405A may comprise a WCDMA section and a HSDPA section. The subtractor 405 may receive as inputs signals generated by the per-cell modules 1-4 403A-403D that may be interpolated by the interpolator 411, as well as 256-chip samples from the delay buffer 304.

The HSDPA interpolation and delay module 407 may comprise suitable circuitry, logic, interfaces, and/or code that may be operable to provide a bypass path for signals received from the delay buffer 304. The HSDPA interpolation and delay module 407 may interpolate cx2 samples to cx16 samples, for example, and may introduce a fixed delay that equals the delay of the interference cancellation module 302 when operating in interference cancellation mode.

The finger MUX 409 may comprise suitable circuitry, logic, interfaces, and/or code that may be operable to select from the plurality of signals generated by the per-cell modules 1-4 403A-403D, the input signal from the delay buffer 304, or a non-cancelling finger input. In this manner, the finger MUX 409 may enable a pass-through mode, an interference cancelling mode, or a non-cancelling mode.

The interpolator 411 may comprise suitable circuitry, logic, interfaces, and/or code that may be operable to interpolate a received signal, such as a cx1 signal and output a cx2 signal, for example.

In operation, a sample input may be received from the delay buffer 304 at a burst of 256-chip worth of samples every 256-chip period. The sampling rate at the input may be Cx2. Another input to the interference cancellation module 320 block may comprise from Fake finger CPICH processing block, which provides the interference cancellation module 320 with channel estimation, time tracking and scrambling code information. The interference cancellation module 320 may generate a single HSDPA output data stream per antenna at Cx16, and multiple per-finger per-Rx-antenna Rake finger output data streams at Cx8, for example.

In HSDPA pass-through mode, the interference cancellation module 320 input samples may be routed via the HSDPA interpolation and delay module 407, which may interpolate Cx2 samples to Cx16 samples and introduce a fixed delay that equals the delay of the interference cancellation module 320 as if operating in HSDPA canceling mode. For pass-through mode rake fingers, the interference cancellation module 320 input samples may be communicated directly to the finger MUX 409, where the Cx2 samples may be interpolated to Cx8 samples and delayed before sending to the associated fingers. The delay may equal the interference cancellation module 320 delay as if the block were operating in canceling mode.

In instances where the interference cancellation module 320 is engaged, where at least one rake finger is in the "canceling mode", or HSDPA is in the canceling mode, the interference cancellation module 320 input samples may be communicated to the subtractor 405. The subtractor 405 may subtract the estimated signal and interference from the original interference cancellation module 320 input samples and generate a common data source for further signal estimation in the downstream per-cell modules, the per-cell modules 1-4 403A-403D. The subtractor 405 may also generate the Canceling HSDPA Output data stream and the Non-Canceling finger output which may comprise a Cx8 output data stream communicated to the finger MUX 409. The subtractor 405 may comprise a Cx2 residue buffer that may be operable to store 3×256 chips worth of samples. The residue buffer may also generate polyphase Cx8 samples for each of the per-cell modules 1-4 403A-403D.

The per-cell modules 1-4 403A-403D may estimate the received signal for each of the SF256 OVSF codes, for example. The estimated signal may be summed up and reconstructed with the channel estimation by the interpolator 411 and fed back into the subtractor 405. Each of the per-cell modules 1-4 403A-403D may receive scrambling code information, associated finger channel estimation and time tracking information from the CHEST pre-processing module 401 as well the subtractor 405 output. Each of the per-cell modules 1-4 403A-403D may be associated with one transmit antenna from a cell. In the case of no Tx diversity, each cell may be associated with one per-cell module; in the case of Tx diversity, each per-cell module is associated with one transmit antenna out of the two transmit antennas of a cell.

The per-cell modules 1-4 403A-403D may generate reconstructed Cx1 per-path signals. The signals may be interpolated to the correct branch of a Cx8 polyphase filter and summed up as a Cx2 signal in the interpolator 411.

Figure 5:
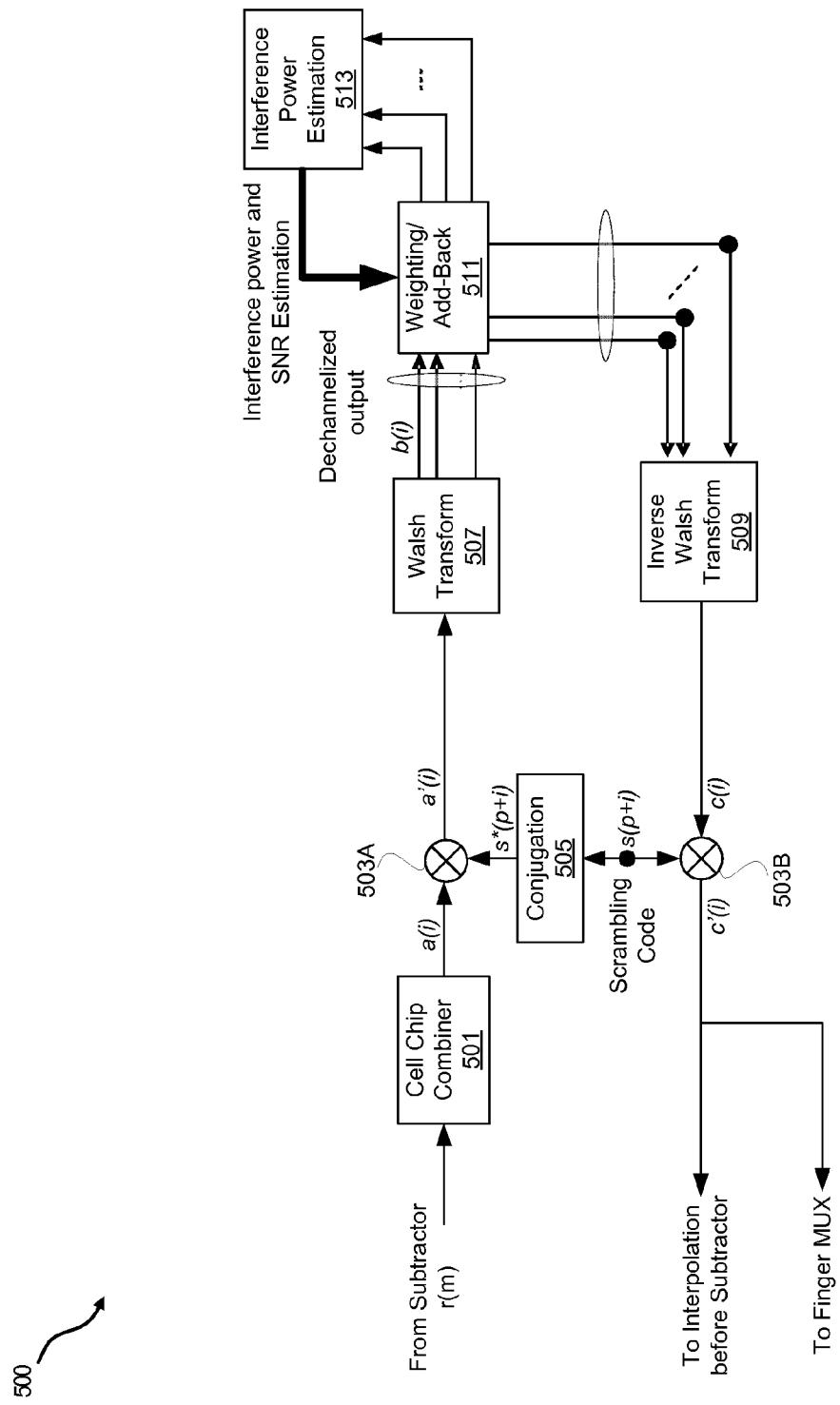
FIG. 5 is a block diagram illustrating an exemplary interference cancellation per-cell module, in accordance with an embodiment of the invention.

FIG. 5 is a block diagram illustrating an exemplary interference cancellation per-cell module, in accordance with an embodiment of the invention. Referring to FIG. 5, there is shown a per-cell module 500 comprising a cell chip combiner 501, multipliers 503A and 503B, a conjugation module 505, a Walsh transform module 507, and inverse Walsh transform module 509, a weighting and add-back module 511, and an interference power estimation module 513.

The cell chip combiner 501 may comprise suitable circuitry, logic, interfaces, and/or code that may be operable to interpolate and maximal ratio combine samples to generate a cx1 output of 256 chips, for example. The cell chip combiner 501 may be described further with respect to FIG. 6.

The multipliers 503A and 503B may comprise suitable circuitry, logic, interfaces, and/or code that may be operable to multiply signals. For example, the multiplier 503A may multiply the output of the cell chip combiner 501, a(i) by the conjugate of the scrambling code, s*(p+i), to result in the signal a'(i). The scrambling code s(p+i) may be associated with the cell with the code phase p given by the interference cancellation block 302, for example, and may comprise an integer multiple of 256.

The conjugation module 505 may comprise suitable circuitry, logic, interfaces, and/or code that may be operable to conjugate the scrambling code s(p+1) to generate the descrambling code s*(p+i).

The Walsh transform module 507 may comprise suitable circuitry, logic, interfaces, and/or code that may be operable to separate a received signal into a plurality of output signals defined by a plurality of OVSF codes, such as SF256, for example. In this manner, the output of the Walsh transform module 507 may represent the signal for each of the SF256 OVSF codes. The Walsh transform module 507 may receive a serial input a'(i) and generate a parallel output. Exemplary pseudo-codes for the Walsh transform may be as follows:

```
Initialize b(i)=a(i), for i=0,...,255;
For Level=0:7
    For i=0:Level
        SF = 256>>Level:
        For j=0:SF/2
            x=b(i*SF+j);
            y=b(i*SF+(SF/2)+j);
        end
    end
End
```

The inverse Walsh transform module 509 may comprise suitable circuitry, logic, interfaces, and/or code that may be operable to generate a single 256-chip output from a plurality of signals, such as SF256 OVSF code signals, for example. The inverse Walsh transform module 509 may receive as inputs, signals generated by the weighting and add-back module 511, and the output of which may be communicatively coupled to the multiplier 503B.

The weighting and add-back module 511 may comprise suitable circuitry, logic, interfaces, and/or code that may be operable to receive estimated signals for each SF256 OVSF codes generated by the Walsh transform module 507, adding to stored signal estimations, and weighted. The outputs of the weighting and add-back module 511 may be communicated to the interference power estimation module 513 and the inverse Walsh transform module 509. The weighting and add-back module 511 may be described further with respect to FIG. 7.

The interference power estimation block 513 may comprise suitable circuitry, logic, interfaces, and/or code that may be operable to estimate OVSF power and signal to noise ratio. The inputs to the interference power estimation block 513 may be communicated from the weighting and add-back module 511 and the outputs may be communicated back to the weighting and add-back module 511 for weighting purposes. The interference power estimation block 513 may be described further with respect to FIG. 8.

In operation, the per-cell module 500 may process the multipath signal associated with a transmitted 256-chip symbol one at a time. The input to the per-cell module 500 may comprise Cx2 samples from the subtractor residue buffer 405A r(m). The Cx2 samples may be interpolated to Cx8 samples in the cell chip combiner 501 and maximum ratio combined to form a Cx1 output of 256 chips. The Cx1 output may then be descrambled, and communicated to the Walsh transform module 507. The output of the Walsh transform module 507 may represent the estimated signal for each of the SF256 OVSF codes. The estimation may be added to the associated stored signal estimation and weighted. The difference of the newly generated signal estimation and the stored signal estimation may then be communicated to the inverse Walsh transform module 509. The output may then be rescrambled, and used to reconstruct the multipath signal to be subtracted by the subtractor 405, described with respect to FIG. 4.

Figure 6:
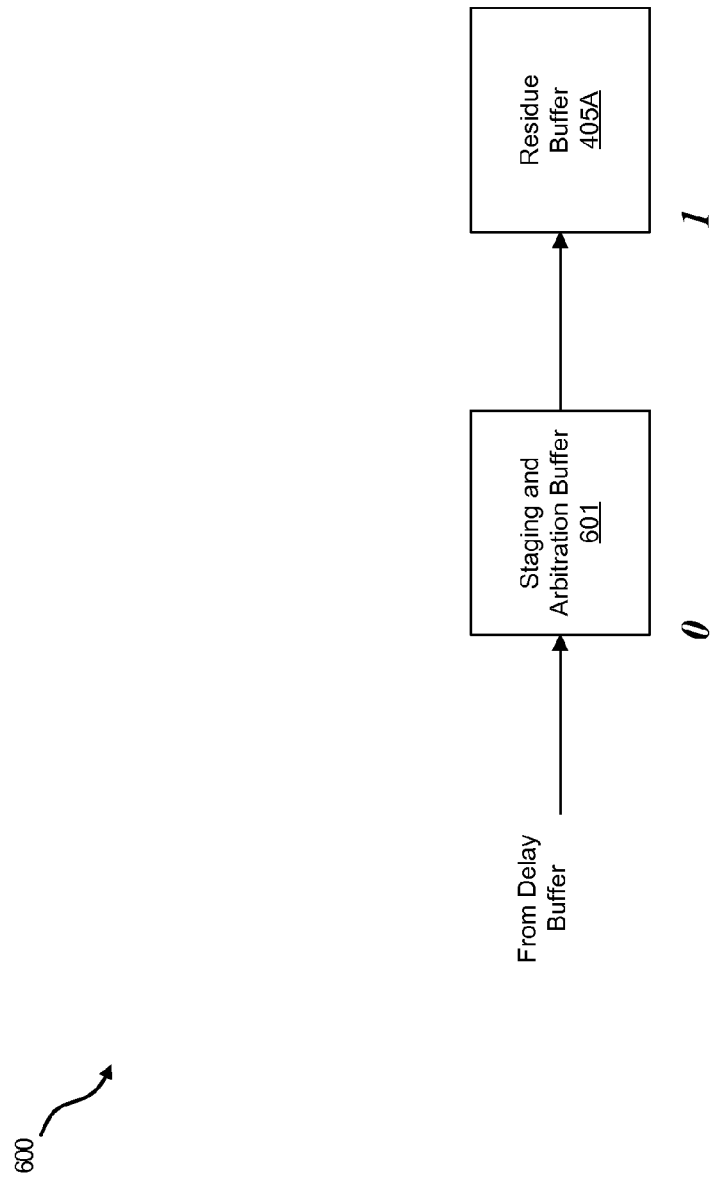
FIG. 6 is a block diagram illustrating exemplary residue buffer filling, in accordance with an embodiment of the invention.

FIG. 6 is a block diagram illustrating exemplary residue buffer filling, in accordance with an embodiment of the invention. Referring to FIG. 6, there is shown residue buffer filling 600 comprising a staging and arbitration buffer 601 and the residue buffer 405A, described with respect to FIG. 4.

The staging and arbitration buffer 601 may comprise suitable circuitry, logic, interfaces, and/or code for aiding in the transfer of data from the delay buffer 304 to the residue buffer 405A without interfering with the primary functions and data flow operations of the delay buffer 304 and the residue buffer 405A.

In operation, new data may be communicated from the delay buffer 304 to the residue buffer 405A via the staging and arbitration buffer 601. In FIGS. 6-14, modules may be utilized in more than one process, as indicated by the numbers near the lower left corner of each module.

Figure 7:
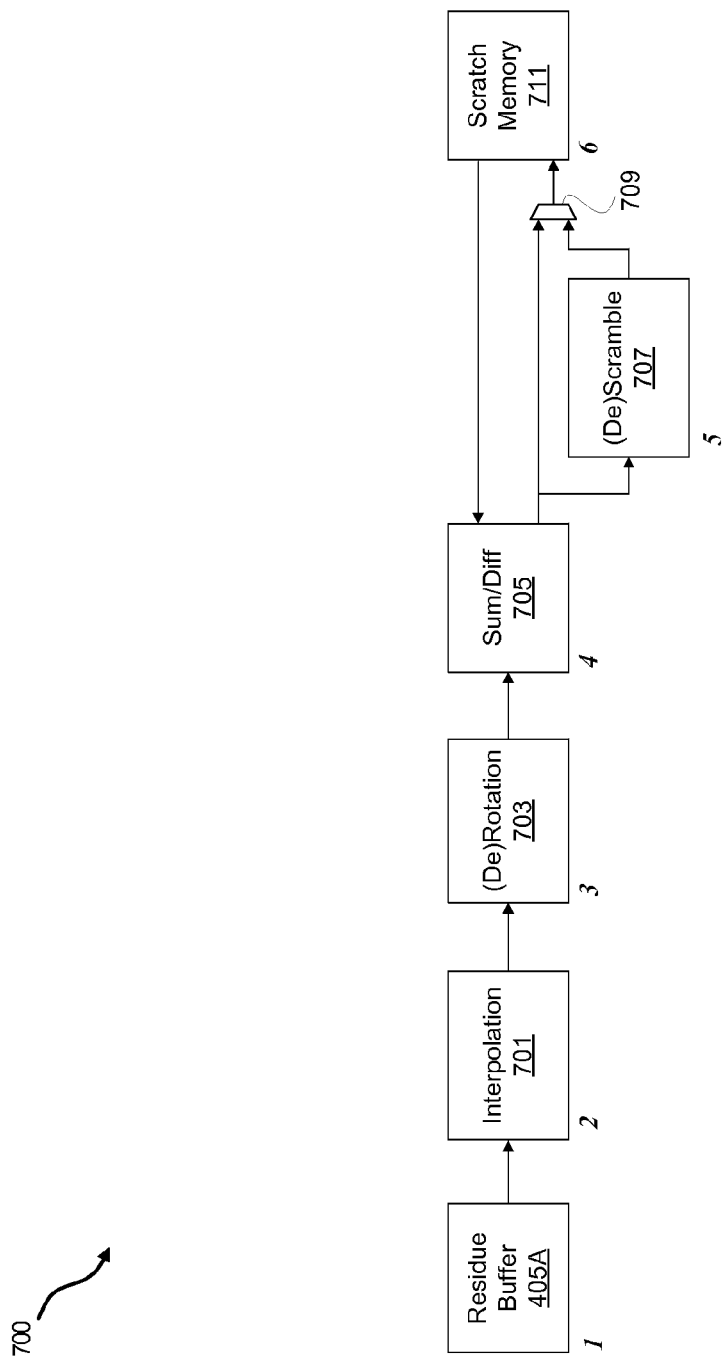
FIG. 7 is a diagram illustrating an exemplary combiner operation flow diagram, in accordance with an embodiment of the invention.

FIG. 7 is a diagram illustrating an exemplary combiner operation flow diagram, in accordance with an embodiment of the invention. Referring to FIG. 7, there is shown combiner operation 700 comprising the residue buffer 405A, an interpolation module 701, a (de)-rotation module 703, a sum/difference module 705, a (de)-scramble module 707, a MUX 709, and a scratch memory 711.

The interpolation module 701 may comprise suitable circuitry, logic, interfaces, and/or code that may be operable to interpolate a received signal at a higher samples per clock signal, cx8 for example, and output a Cx1 or a Cx2 signal, for example.

The (De)-rotation module 703 may comprise suitable circuitry, logic, interfaces, and/or code that may be operable to rotate and/or de-rotate a received channel. In this manner, the rotation effects of the wireless channel may be substantially removed. The (De)-rotation module 703 may receive as an input the interpolated data generated by the interpolation module 701 and descramble the signal by applying the conjugate of a scrambling code.

The sum/difference module 705 may comprise suitable circuitry, logic, interfaces, and/or code that may be operable to add an accumulated signal to an input signal. The sum/difference module 705 may be operable to add a signal received from the scratch memory 711 to the signal received from the (De)-rotation module 703.

The (De)-scramble module 707 may comprise suitable circuitry, logic, interfaces, and/or code that may be operable to scramble and/or descramble a received signal by applying a scrambling/descrambling code.

The MUX 709 may comprise suitable circuitry, logic, interfaces, and/or code that may be operable to select which of a plurality of received signals to communicate as an output signal. For example, one of the signals received from the sum/difference module 705 and the (De)-scramble module 707 may be communicated to the scratch memory 711. In this manner, the MUX 709 may enable a signal pass-though mode and a scramble/unscramble mode.

The scratch memory 711 may comprise suitable circuitry, logic, interfaces, and/or code that may be operable to store the processed data for subsequent retrieval and processing.

In operation, the combiner operation 700 may comprise the functions of the cell chip combiner 501 and the multiplier 503A, described with respect to FIG. 5. The combiner operation 700 may comprise the interpolation of Cx2 samples received from the residue buffer 405A into cx8 samples. The combiner operation 700 may operate on four chips in parallel, for example, which indicates that 8 Cx2 samples per clock may be read from the residue buffer 405.

The numbers below each block in FIG. 7 indicates where hardware blocks are reused in subsequent operations when the same digit is shown below a hardware block in FIGS. 8-14.

Figure 8:
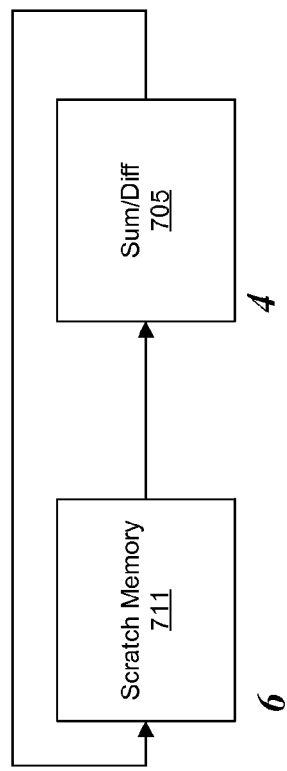
FIG. 8 is a diagram illustrating an exemplary per-cell fast hadamard transform data flow diagram, in accordance with an embodiment of the invention.

FIG. 8 is a diagram illustrating an exemplary per-cell fast hadamard transform data flow diagram, in accordance with an embodiment of the invention. Referring to FIG. 8, there is shown fast hadamard transform (FHT) process 800 comprise the scratch memory module 711 and the sum/difference module 705, which are substantially as described with respect to FIG. 7. The FHT process 800 may be substantially similar to the Walsh transform module 507 described with respect to FIG. 5.

In operation, the FHT process 800 may be operable to process 16 states, or codes, in parallel, but the invention need not be so limited. This number of states implies that 16 samples or codes may be read from the scratch memory 711 each clock, and there may be 128 clocks per 256 code FHT. The blocks in FHT process 800 may be rearranged and reapplied for use in inverse FHT processes, thereby enabling reuse of hardware blocks.

Figure 9:
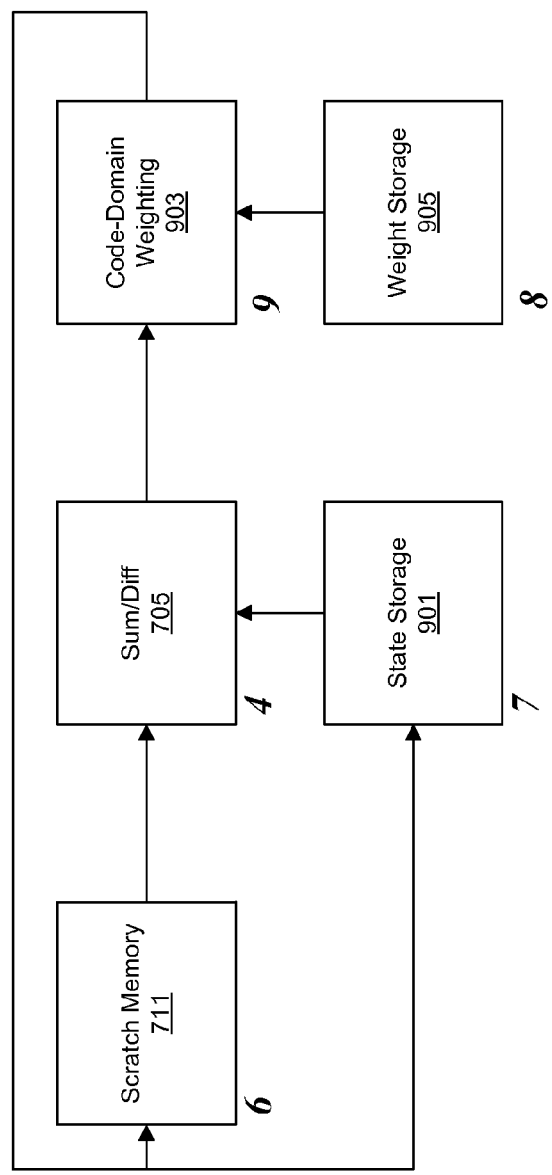
FIG. 9 is a diagram illustrating an exemplary per-cell weighting and addback data flow diagram, in accordance with an embodiment of the invention.

FIG. 9 is a diagram illustrating an exemplary per-cell weighting and addback data flow diagram, in accordance with an embodiment of the invention. Referring to FIG. 9, there is shown a weighting and addback operation 900 comprising the scratch memory 711, the sum/difference module 705, a state storage module 901, a code-domain weighting module 903, and a weight storage module 905.

The state storage module 901 may comprise suitable circuitry, logic, interfaces, and/or code that may be operable to store the per-code state information. The state storage module 901 may receive as an input the output of the code-domain weighting module 903.

The code-domain weighting module 903 may comprise suitable circuitry, logic, interfaces, and/or code that may be operable to perform weighting estimating of each of the OVSF codes determined in the FHT process 800. The code-domain weighting module 903 may receive, as inputs, the output signals from the sum/difference module 705 and the weight storage module. The output of the code-domain weighting module 903 may be communicated to the scratch memory 711 and the state storage module 901.

The weight storage module 905 may comprise suitable circuitry, logic, interfaces, and/or code that may be operable to store per-code weight data. The data in the weight storage module 905 may be accessed by the code-domain weighting module 903.

In operation, per-code FHT data may be retrieved from the scratch memory 711 and added to signal estimation data stored in the state storage module 901. The resulting data may be weighted by the code-domain weighting module 903 utilizing stored per-code weight data from the weight storage module 905. In an exemplary embodiment, four codes may be processed per clock through the weighting portion of the weighting and addback operation 900. The addback process may be skipped in symbol N+1, iteration 0, and weighting may be skipped for symbol N, iteration 1.

Figure 10:
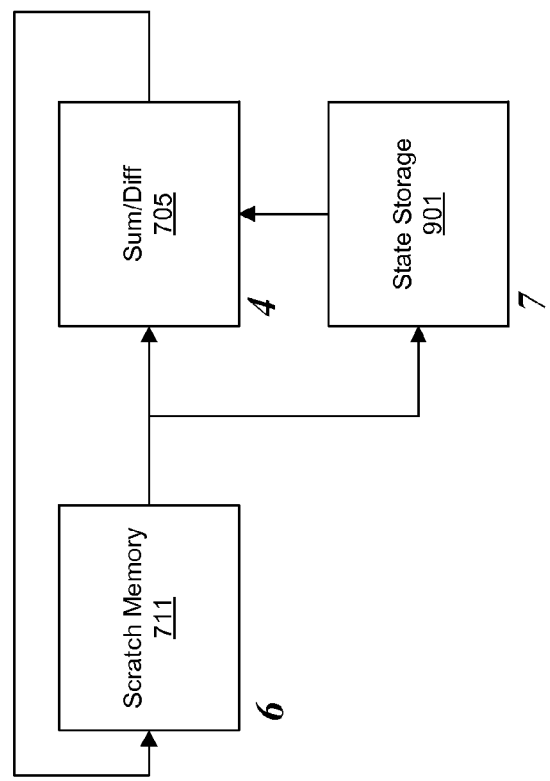
FIG. 10 is a diagram illustrating an exemplary per-cell un-addback data flow diagram, in accordance with an embodiment of the invention.

FIG. 10 is a diagram illustrating an exemplary per-cell un-addback data flow diagram, in accordance with an embodiment of the invention. Referring to FIG. 10, there is shown an un-addback process 1000 comprising the scratch memory 711, the sum/difference module 705, described with respect to FIG. 7 and the state storage module 901, described with respect to FIG. 9.

In operation, new per-code state data values may be written to the state storage module 901 after each state value is read for the un-addback operations. In an embodiment of the invention, four codes per process clock may be processed through the un-addback process 1000, which may only be utilized for symbol N, iteration 0.

Figure 11:
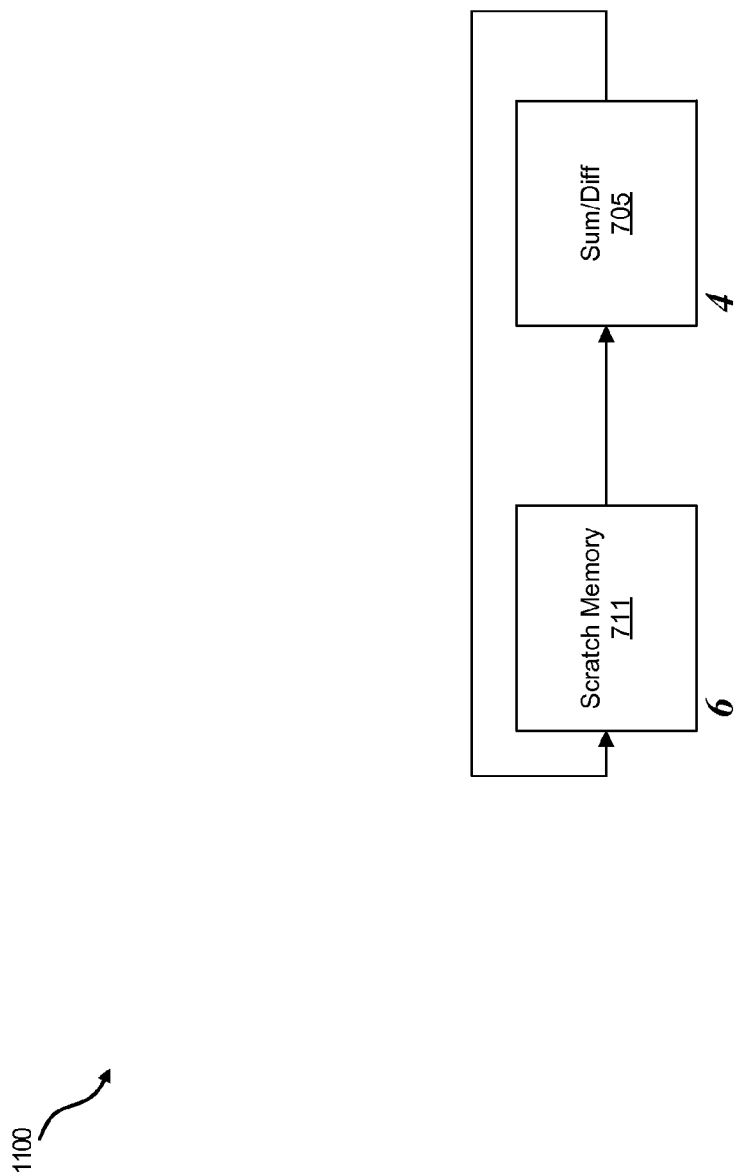
FIG. 11 is a diagram illustrating an exemplary per-cell inverse fast hadamard transform data flow diagram, in accordance with an embodiment of the invention.

FIG. 11 is a diagram illustrating an exemplary per-cell inverse fast Hadamard transform data flow diagram, in accordance with an embodiment of the invention. Referring to FIG. 10, there is shown an inverse fast hadamard transform (IFHT) process 1100 comprising the scratch memory module 711 and the sum/difference module 705, both described with respect to FIG. 7. The IFHT process 1100 may be substantially similar to the inverse Walsh transform module 509, described with respect to FIG. 5.

In operation, the IFHT process 1100 may operate on 16 states, or codes, in parallel through the scratch memory module 711 and the sum/difference module 705, and thus may be utilized for 8 IFHT stages in this example. However, the invention may not be so limited, and may comprise any number of parallel states and number of stages.

Figure 12:
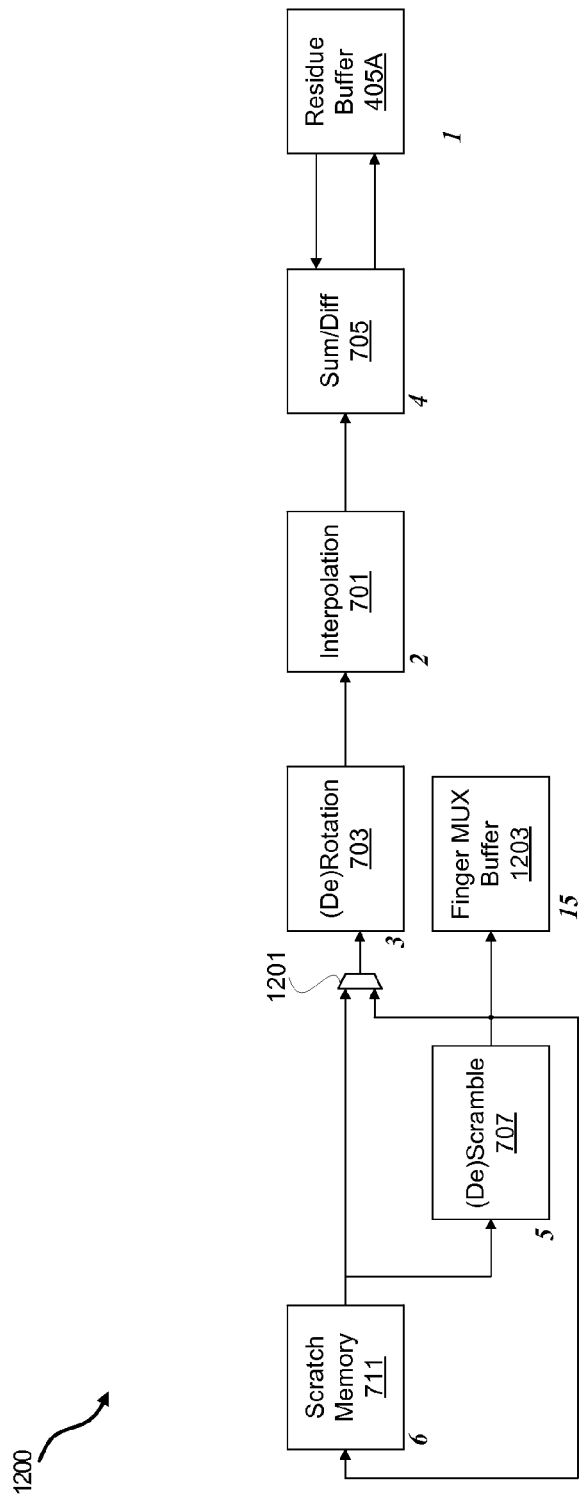
FIG. 12 is a diagram illustrating an exemplary per-cell path regeneration and residue buffer update data flow diagram, in accordance with an embodiment of the invention.

FIG. 12 is a diagram illustrating an exemplary per-cell path regeneration and residue buffer update data flow diagram, in accordance with an embodiment of the invention. Referring to FIG. 12, there is shown path regeneration and buffer update process 1200 comprising the scratch memory 711, the (De)scramble module 707, the (De)rotation module 703, the interpolation module 701, the sum/difference module 705, the residue buffer 405A, a MUX 1201, and a finger MUX buffer 1203. The MUX 1201 may be substantially similar to the MUX 709 described with respect to FIG. 7, and may be operable to select from inputs from the scratch memory 711 or the (De)scramble module 707.

The finger MUX buffer 1203 may comprise a buffer that may be operable to store data from the symbol N, iteration 1 with one path per cell. The finger MUX buffer 1203 may receive as an input the signal from the (De)scramble module 707.

In operation, the path regeneration and buffer update process 1200 may operate on four chips in parallel with eight Cx2 samples per clock written to the residue buffer 405A. In an embodiment of the invention, the residue buffer 405A update may be performed for symbol N, iteration 0 and symbol N+1, iteration 0, while the finger MUX buffer 1203 update may occur for the symbol N, iteration 1, for example. The paths from the (De)scramble module 707 to the scratch memory 711 and from the scratch memory 711 to the (De)scramble module 707 may be utilized for the regeneration of the first path only, while the path from the scratch memory 711 to the MUX 1201 may be utilized for the last N−1 paths, for example.

Figure 13:
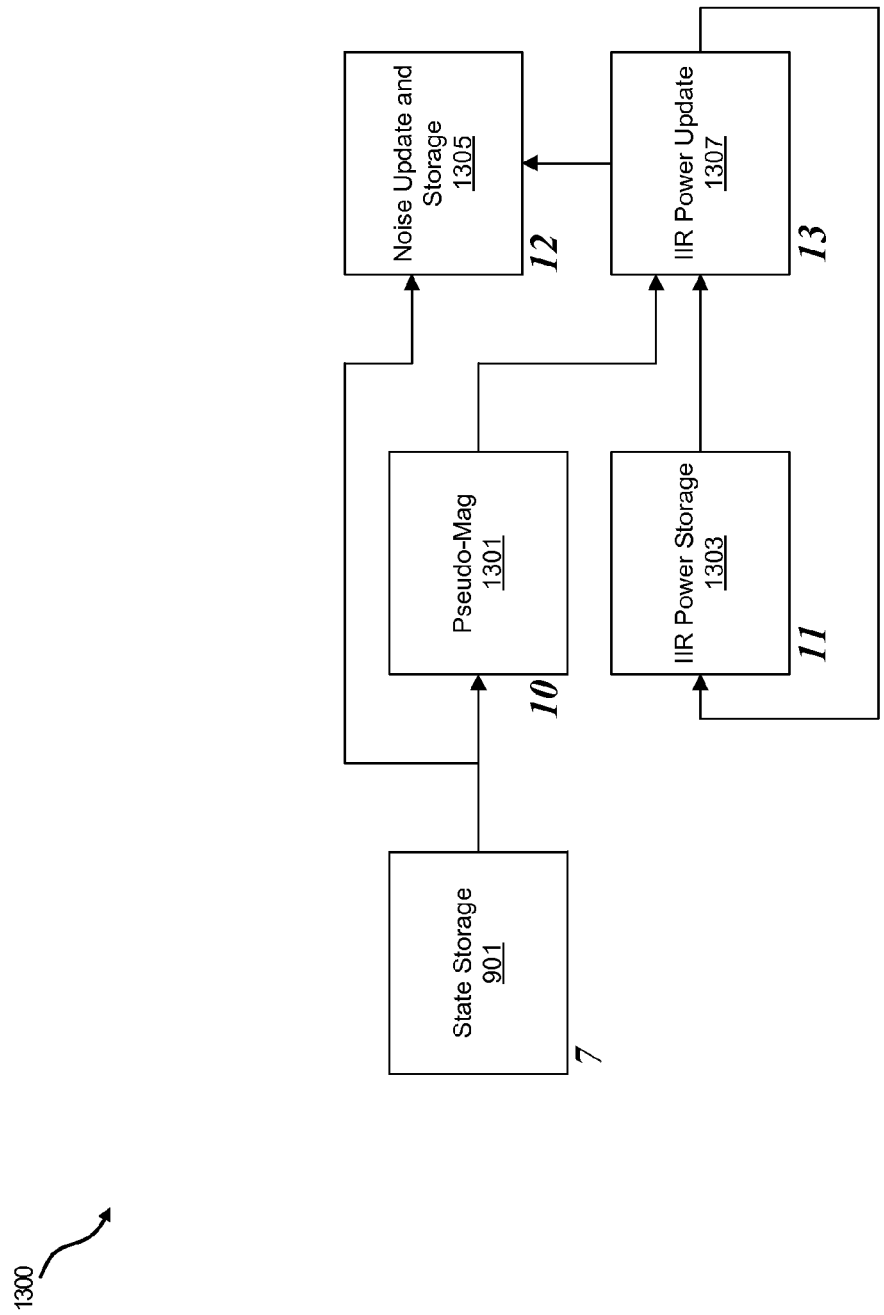
FIG. 13 is a diagram illustrating an exemplary power/noise update data flow diagram, in accordance with an embodiment of the invention.

FIG. 13 is an exemplary power/noise update data flow diagram, in accordance with an embodiment of the invention. Referring to FIG. 13, there is shown an infinite impulse response (IIR) power/noise update process 1300 comprising the state storage module 901, a pseudo-mag module 1301, an IIR power storage module 1303, a noise update and storage module 1305, and an IIR power update module 1307.

The pseudo-mag module 1301 may comprise suitable circuitry, logic, interfaces, and/or code that may be operable to generate an approximate magnitude value for per-code data, using the asqrt function, for example, retrieved from the state storage module 901. The asqrt function may comprise a pseudo-square-root-sum-square function. The output of the pseudo-mag module 1301 may be communicatively coupled to the IIR power update module 1307.

The IIR power storage module 1303 may be operable to store per-code IIR power levels determined by the IIR power update module 1307. The output of the IIR power storage module 1303 may in turn be communicated back to the IIR power update module 1307.

The noise update and storage module 1305 may comprise suitable circuitry, logic, interfaces, and/or code that may be operable to determine per-code noise levels in data received from the state storage module 901. The noise update and power storage module 1305 may also receive as an input the IIR power update module 1307 output.

The IIR power update module 1307 may comprise suitable circuitry, logic, interfaces, and/or code that may be operable to determine per-code power levels of data received from the pseudo-mag module 1301 and the IIR power storage module 1303.

In operation, the IIR power/noise update process 1300 may process 2 codes per clock prior to weight update operations. In an embodiment of the invention, the IIR power/noise update may be performed on the symbol N, iteration 1 only.

Figure 14:
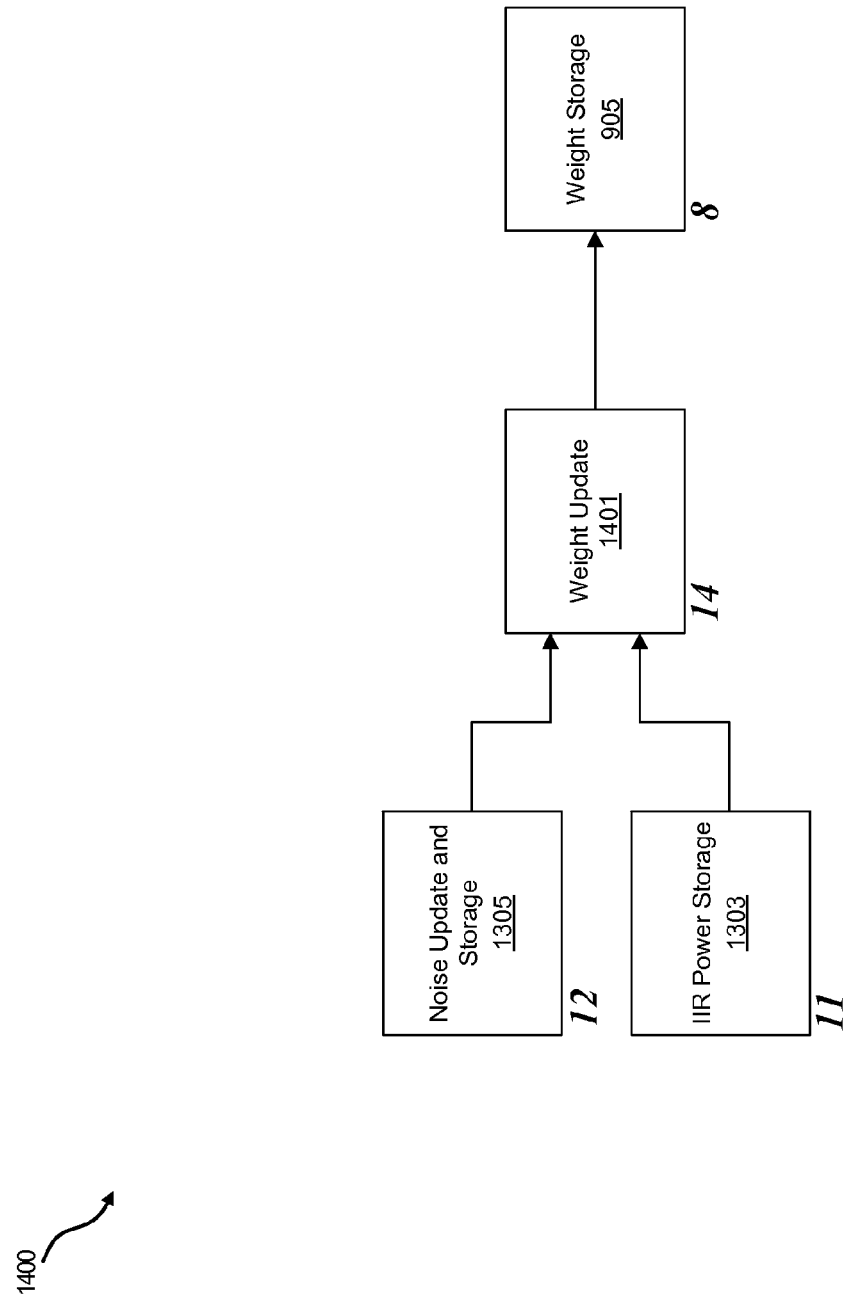
FIG. 14 is a diagram illustrating an exemplary per-code weight update data flow diagram, in accordance with an embodiment of the invention.

FIG. 14 is a diagram illustrating an exemplary per-code weight update data flow diagram, in accordance with an embodiment of the invention. Referring to FIG. 14, there is shown per-code weight update process 1400 comprising the noise update and storage module 1305, the IIR power storage module 1303, a weight update module 1401, and the weight storage module 905.

The weight update module 1401 may comprise suitable circuitry, logic, interfaces, and/or code that may be operable to generate per-code weight update data from data received from the noise update and storage module 1305 and the IIR power storage module 1303. The output of the weight update module 1401 may be communicated to the weight storage module 905.

In operation, the per-code weight update process 1400 may operate on two codes per clock, or alternatively, one code per clock. For example, in instances where the IIR power/noise update processes two codes per clock, then the per-code weight update process 1400 may process one code per clock. Alternatively, in instances where the IIR power/noise update processes one code per clock, then the per-code weight update process 1400 processes two codes per clock. In an exemplary embodiment of the invention, the per-code weight update process 1400 may operate on the symbol N, iteration 1 only.

Various embodiments of the invention provide a method and system for optimizing programmable interference suppression. In this regard, a wireless system may receive a plurality of multipath signals from a plurality of transmitters 102/104 and sequentially process each of a plurality of data symbols in the received multipath signals utilizing a plurality of shared hardware modules 405A, 601, 701, 703, 705, 707, 711, 901, 903, 905, 1203, 1301, 1303, 1305, 1307, and 1401. Desired information may be recovered from data transmitted by one or more of the plurality of transmitters 102/104 utilizing the interference suppressed signal. Chips of data may be cell combined utilizing one or more of the plurality of shared hardware modules 405A, 601, 701, 703, 705, 707, 711, 901, 903, 905, 1203, 1301, 1303, 1305, 1307, 1401. The plurality of shared modules 405A, 601, 701, 703, 705, 707, 711, 901, 903, 905, 1203, 1301, 1303, 1305, 1307, and 1401 may comprise channel rotation modules and sum and difference modules. One or more fast Hadamard transforms and/or inverse Hadamard transforms may be performed utilizing one or more of the plurality of shared hardware modules 405A, 601, 701, 703, 705, 707, 711, 901, 903, 905, 1203, 1301, 1303, 1305, 1307, 1401. Data symbols may be interpolated, scrambled, descrambled, and/or weighted and added back utilizing one or more of the plurality of shared hardware modules 405A, 601, 701, 703, 705, 707, 711, 901, 903, 905, 1203, 1301, 1303, 1305, 1307, 1401.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for optimizing programmable interference suppression.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for digital signal processing, the method comprising:
    generating, using a subtractor hardware module, a residual chip-level signal by subtracting an estimate of an interference suppressed version of a received signal from said received signal;
    interpolating, using a combiner hardware module comprising a first hardware module and a memory, said residual signal;
    generating, using a transform hardware module comprising said first hardware module and said memory, a residual symbol-level signal based on said interpolated residual signal; and
    generating, using a weighting hardware module comprising said first hardware module and said memory, an addback symbol-level signal based on said estimate of said interference suppressed version of said received signal and said residual symbol-level signal,
    wherein said addback symbol-level signal is used to generate an updated estimate of said interference suppressed version of said received signal, and
    wherein said updated estimate of said interference suppressed version of said received signal is used for iterative interference cancellation of said received signal.

2. The method according to claim 1, further comprising maximum ratio combining samples of said interpolated residual signal, using said combiner hardware module, before said generating said residual symbol-level signal.

3. The method according to claim 1, further comprising removing, using channel rotation modules, rotation effects of a channel on which said received signal was transmitted from said interpolated residual signal.

4. The method according to claim 1, wherein said first hardware module comprises sum and difference modules.

5. The method according to claim 1, wherein said generating said residual symbol-level signal comprises performing one or more fast Hadamard transforms utilizing said transform hardware module.

6. The method according to claim 1, further comprising performing one or more inverse fast Hadamard transforms utilizing said transform hardware module.

7. The method according to claim 1, further comprising scrambling said interpolated residual signal utilizing said combiner hardware module.

8. The method according to claim 1, further comprising descrambling said interpolated residual signal utilizing said combiner hardware module.

9. The method according to claim 1, wherein said generating said addback symbol-level signal comprises weighting and adding back said residual symbol-level signal.

10. A system comprising:
    a subtractor hardware module configured to generate a residual chip-level signal by subtracting an estimate of an interference suppressed version of a received signal from said received signal;
    a combiner hardware module, comprising a first hardware module and a memory, configured to interpolate said residual signal;
    a transform hardware module, comprising said first hardware module and said memory, configured to generate a residual symbol-level signal based on said interpolated residual signal; and
    a weighting hardware module, comprising said first hardware module and said memory, configured to generate an addback symbol-level signal based on said estimate of an interference suppressed version of a received signal and said residual symbol-level signal,
    wherein said addback symbol-level signal is used to generate an updated estimate of the interference suppressed version of the received signal, and
    wherein the updated estimate of the interference suppressed version of the received signal is used for iterative interference cancellation of the received signal.

11. The system according to claim 10, wherein said combiner hardware module is further configured to maximum ratio combine samples of said interpolated residual signal.

12. The system according to claim 10, wherein said combiner hardware module further comprises channel rotation modules.

13. The system according to claim 10, wherein said first hardware module comprises sum and difference modules.

14. The system according to claim 13, wherein said transform hardware module is further configured to perform one or more fast Hadamard transforms.

15. The system according to claim 14, wherein said transform hardware module is further configured to perform one or more inverse fast Hadamard transforms.

16. The system according to claim 10, wherein said combiner hardware module is further configured to scramble said interpolated residual signal.

17. The system according to claim 16, wherein said combiner hardware module is further configured to descramble said interpolated residual signal.

18. The system according to claim 17, wherein said weighting hardware module is further configured to weight and add back said residual symbol-level signal.

* * * * *

UNITED STATES PATENT AND TRADEMARK OFFICE
CERTIFICATE OF CORRECTION

PATENT NO.        : 8,498,321 B2                                      Page 1 of 1
APPLICATION NO.   : 12/575840
DATED             : July 30, 2013
INVENTOR(S)       : Mark Hahm It is certified that error appears in the above-identified patent and that said Letters Patent is hereby corrected as shown below:

In the Claims:

Column 26, Line 20, please replace "an interference" with --said interference--.

Column 26, Line 20, please replace "a received" with --said received--.

Column 26, Line 23, please replace "the interference" with --said interference--.

Column 26, Line 24, please replace "the received" with --said received--.

Column 26, Line 25, please replace "the updated" with --said updated--.

Column 26, Line 25, please replace "the inference" with --said interference--.

Column 26, Line 26, please replace "the received" with --said received--.

Column 26, Line 27, please replace "the received" with --said received--.

Signed and Sealed this
Twenty-sixth Day of November, 2013

Margaret A. Focarino
*Commissioner for Patents of the United States Patent and Trademark Office*